United States Patent [19]
Takenaka et al.

[11] Patent Number: 6,026,449
[45] Date of Patent: Feb. 15, 2000

[54] COMPUTERS WITH A PROOF FUNCTION

[75] Inventors: Makoro Takenaka, Higashiyamato; Yasuo Ikeya, Tokyo; Katsuyoshi Suzuki, Hamura, all of Japan

[73] Assignee: Casio Computer Co., Ltd., Tokyo, Japan

[21] Appl. No.: 08/940,614

[22] Filed: Sep. 30, 1997

Related U.S. Application Data

[62] Division of application No. 08/560,894, Nov. 20, 1995, Pat. No. 5,870,318.

[30] Foreign Application Priority Data

Feb. 14, 1995 [JP] Japan ........................................ 7-50513
Feb. 20, 1995 [JP] Japan ........................................ 7-56490

[51] Int. Cl.$^7$ .............................. G06F 13/00; G06F 3/00
[52] U.S. Cl. ........................... 710/14; 708/130; 708/136; 708/164; 708/168
[58] Field of Search .............................. 395/834; 710/14, 710/59; 708/130, 131, 136, 142, 160, 164, 168

[56] References Cited

U.S. PATENT DOCUMENTS

| | | | |
|---|---|---|---|
| 3,760,375 | 9/1973 | Irwin et al. | 340/172.5 |
| 3,898,623 | 8/1975 | Cormier | 340/172.5 |
| 4,095,215 | 6/1978 | Mortimer | 340/311 |
| 4,386,412 | 5/1983 | Ito | 364/710 |
| 4,580,235 | 4/1986 | Yanagawa | 364/710 |
| 5,003,458 | 3/1991 | Yamaguchi et al. | 364/200 |
| 5,161,118 | 11/1992 | Matsuda et al. | 364/744 |
| 5,335,193 | 8/1994 | Kawawaki | 364/709.12 |
| 5,457,672 | 10/1995 | Shinada et al. | 369/47 |
| 5,542,079 | 7/1996 | Hatakeyama | 395/800 |
| 5,613,163 | 3/1997 | Marron et al. | 395/879 |

FOREIGN PATENT DOCUMENTS

| | | |
|---|---|---|
| 3320213 A1 | 1/1984 | Germany . |
| 3725284 A1 | 2/1989 | Germany . |
| 57 08696 | 5/1982 | Japan . |
| 57-086965 | 5/1982 | Japan . |
| 60-20661 | 2/1985 | Japan . |

OTHER PUBLICATIONS

Patent Abstracts of Japan, vol. 6, No. 171 (p–140), Sep. 4, 1982 & JP–A–57 086965 (NEC Corp.), May 31, 1982.

*Primary Examiner*—Thomas C. Lee
*Assistant Examiner*—Tanh Nguyen
*Attorney, Agent, or Firm*—Frishauf, Holtz, Goodman, Langer & Chick, P.C.

[57] ABSTRACT

The inventive computer includes a RAM which sequentially stores a series of calculation expression data thereto, a proof unit which proves the series of calculation expression data by inputting those data again, and a display which displays calculation data found to be non-coincident in the proof operation. First, when a series of calculation expression data is input to the computer, the computer performs a required calculation on the series of calculation expression data and sequentially stores the data in the RAM. After the series of calculations on the data is completed, the user inputs data on designation of a proof operation to confirm whether the result of the calculation is correct. Thus, the proof mode is selected and a second series of calculation expression data is input. At this time, terms of the calculation expression data stored in the RAM are sequentially compared with corresponding terms of the second series of calculation expression data to determine whether those data coincide with each other. If non-coincidence is determined, the terms of the calculation data determined to be non-coincident are read from the RAM and the second input calculation expression data and displayed alternately in accordance with the user's instruction.

20 Claims, 20 Drawing Sheets

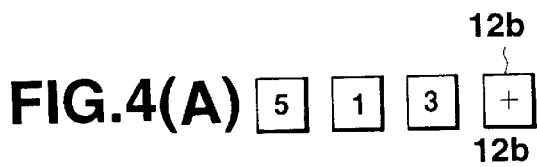
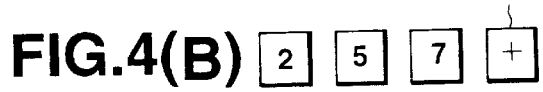
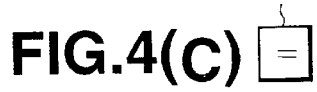
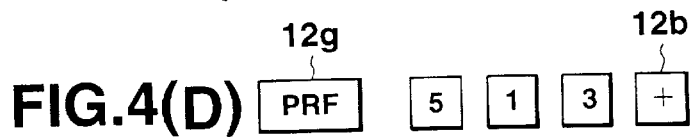
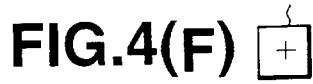
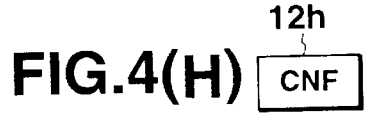
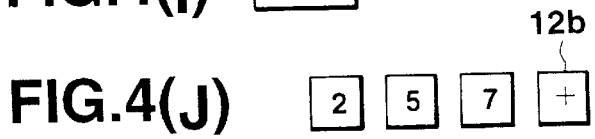
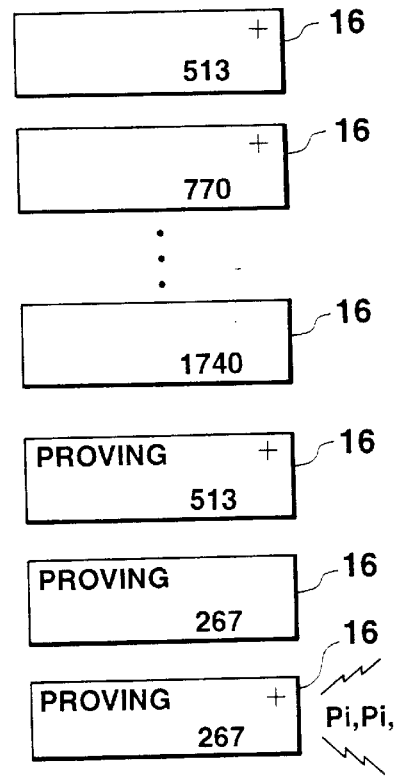
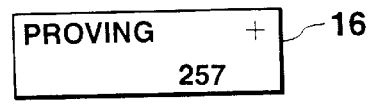
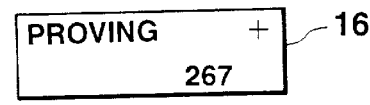
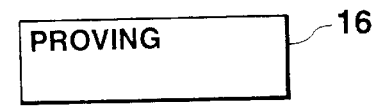
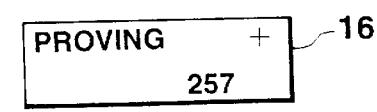

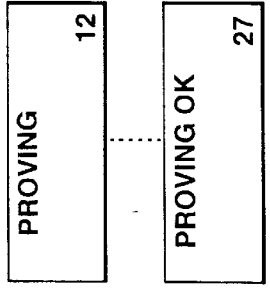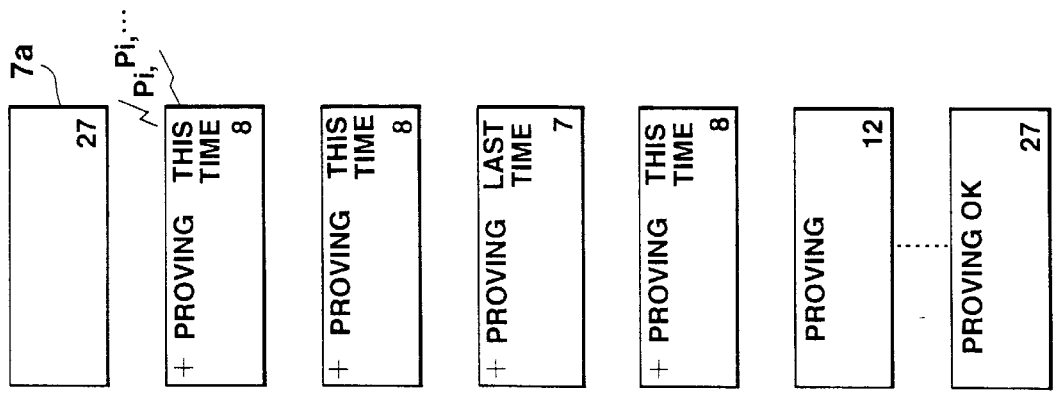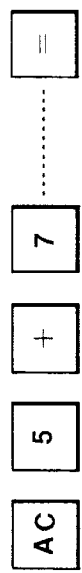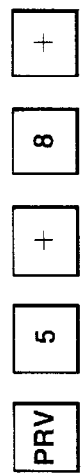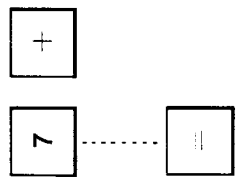
FIG.14(a) FIG.14(b) FIG.14(c) FIG.14(d) FIG.14(e) FIG.14(f) FIG.14(g)

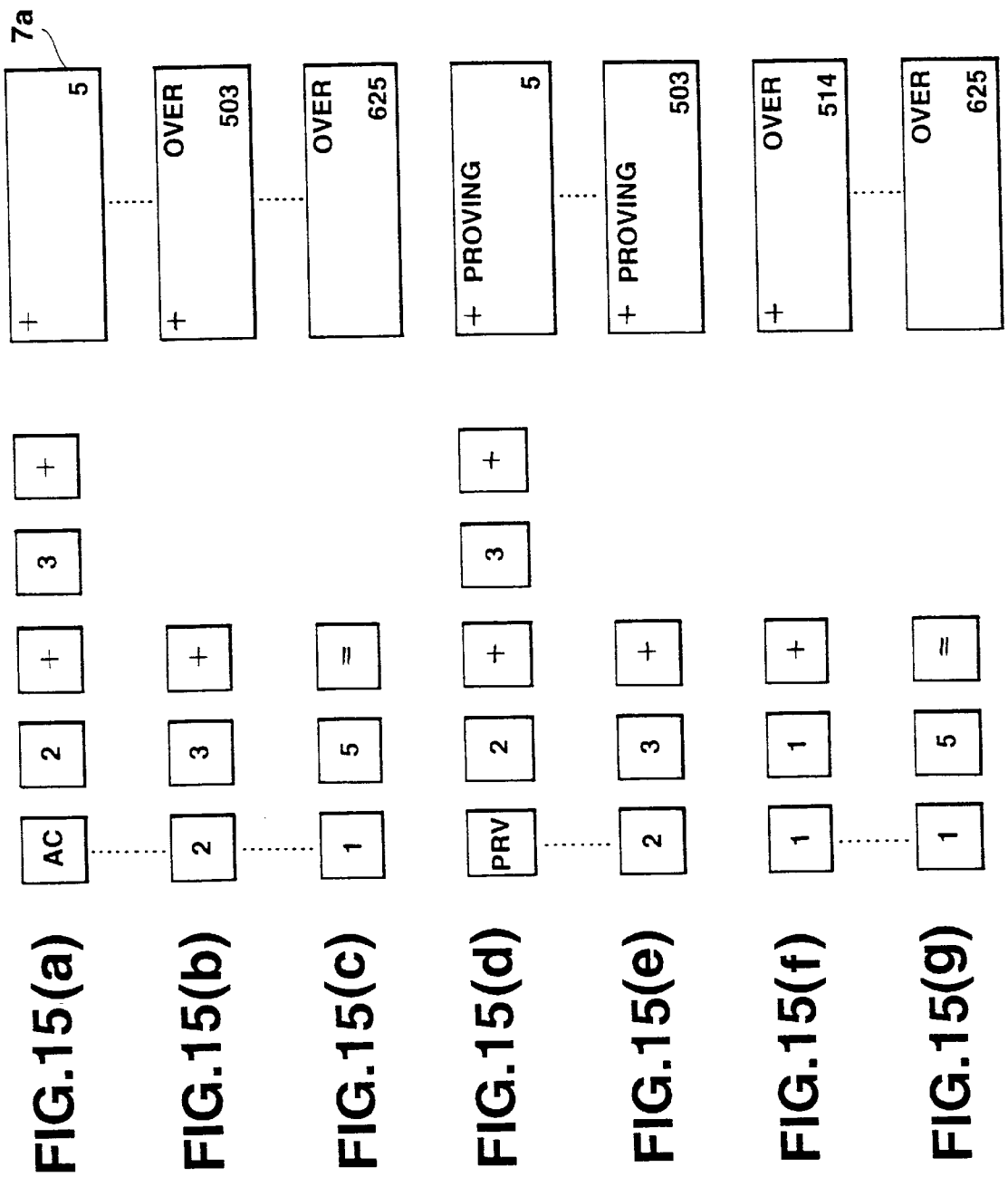

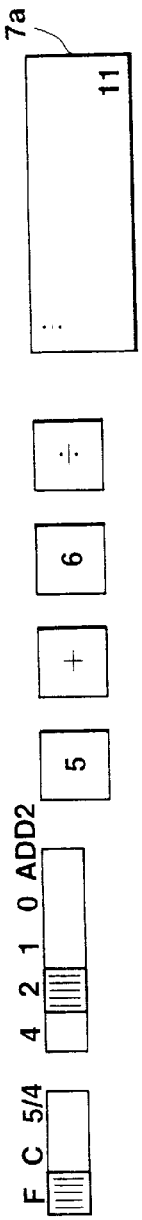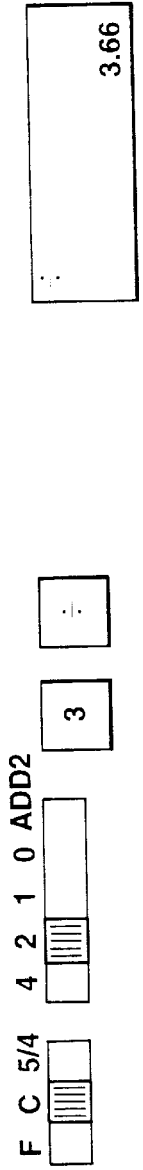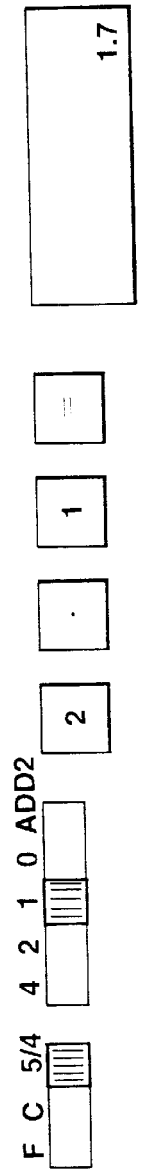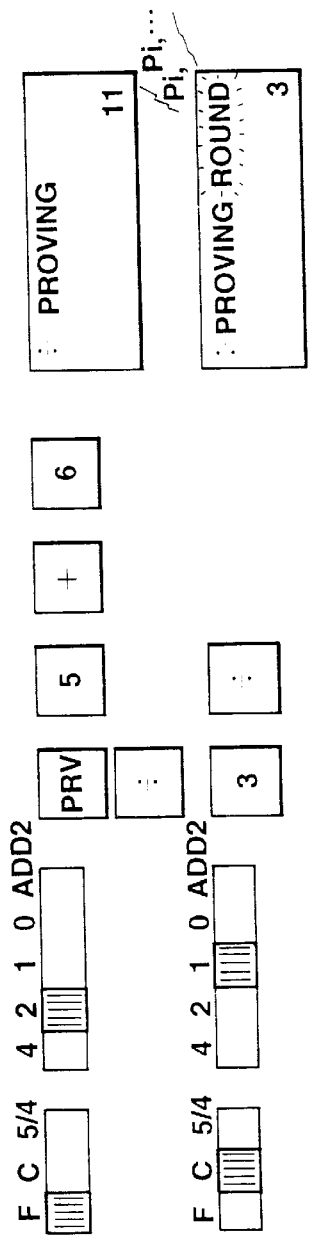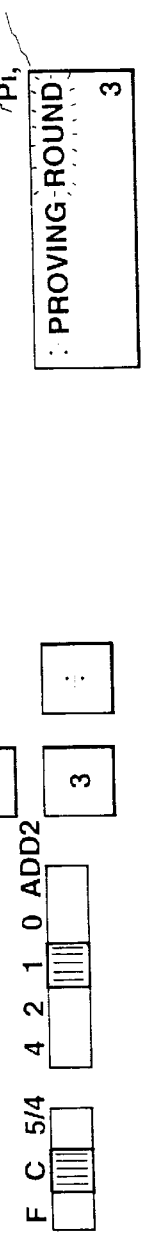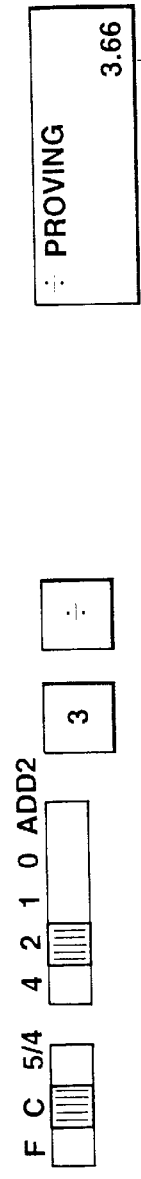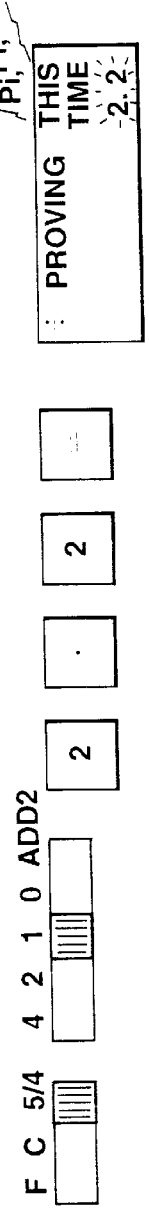

COMPUTERS WITH A PROOF FUNCTION

This is a division of application Ser. No. 08/560,894 filed Nov. 20, 1995, now U.S. Pat. No. 5,870,318.

BACKGROUND OF THE INVENTION

1. Field of the Invention

The present invention relates to computers, and more particularly to a computer with a proof function which calculates and stores a series of calculation expression data input and compares the data with a series of calculation expression data input next time to prove the result of the calculation.

2. Description of the Prior Art

Conventionally, it can be carried out for proving purposes that after any calculation has been performed, the same calculation is again performed and the result of the former calculation is compared with the result of the latter calculation.

A computer has been considered which has the function of proving the result of the calculation under control thereof. This computer sequentially stores a series of calculation expression data input first, and performs a calculation on the data to obtain the result. A series of second calculation expression data which is believed to be the same as the first input series of calculation expression data is sequentially input and compared with the stored first series of calculation expression data in units of a term for proving purposes. As a result, if term data on the first series of calculation expression data is not coincident with the corresponding term data of the second input series of calculation data, this fact is reported to the outside.

However, when it is determined by the proof operation in the computer that the first input data is not coincident with the second input data, it is impossible to confirm which or both of the first and second data which is determined to be not coincident with each other are wrong.

SUMMARY OF THE INVENTION

The present invention has been made in view of the above problem. It is an object of the present invention to provide a computer which is capable of easily confirming which of the first and second input data which is determined to be not coincident with each other by the proof operation of the computer is wrong to thereby perform a correct reliable proof operation.

In order to achieve the above object, the present invention provides a computer comprising:

calculation expression data input means for inputting calculation expression data into the computer;

storage means for sequentially storing the calculation expression data input by the calculation expression data input means;

comparison and determination means for sequentially comparing and determining whether the calculation expression data stored in the storage means coincides with new calculation expression data input by the calculation expression data input means; and when the comparison and determination means determines that the calculation expression data stored in the storage means is not coincident with the new input calculation expression data, non-coincidence data display means for alternately displaying non-coincident data portions of the calculation expression data stored in the storage means and the new input calculation expression data.

By such arrangement, a correct reliable proof operation is achieved.

BRIEF DESCRIPTION OF THE DRAWINGS

FIGS. 4(a)–4(j) illustrate display operations corresponding to key operations performed in the proof and calculation process of the computer;

FIGS. 14(a)–14(g) keys depressed at a key-in unit of the computer as the second embodiment and corresponding displays appearing on a display window in a side-by-side relationship;

FIGS. 15(a)–15(g) are similar to FIGS. 14(a)–(g).

FIGS. 22(a)–(g) illustrate the set states of a round switch and a decimal point designating switch of the computer as the third embodiment, keys depressed at the key-in unit, and corresponding displays appearing in a display window present in a side-by-side relationship.

DESCRIPTION OF THE PREFERRED EMBODIMENTS

Embodiments of the present invention will be described with reference to the drawings.

First Embodiment

Figure 1:
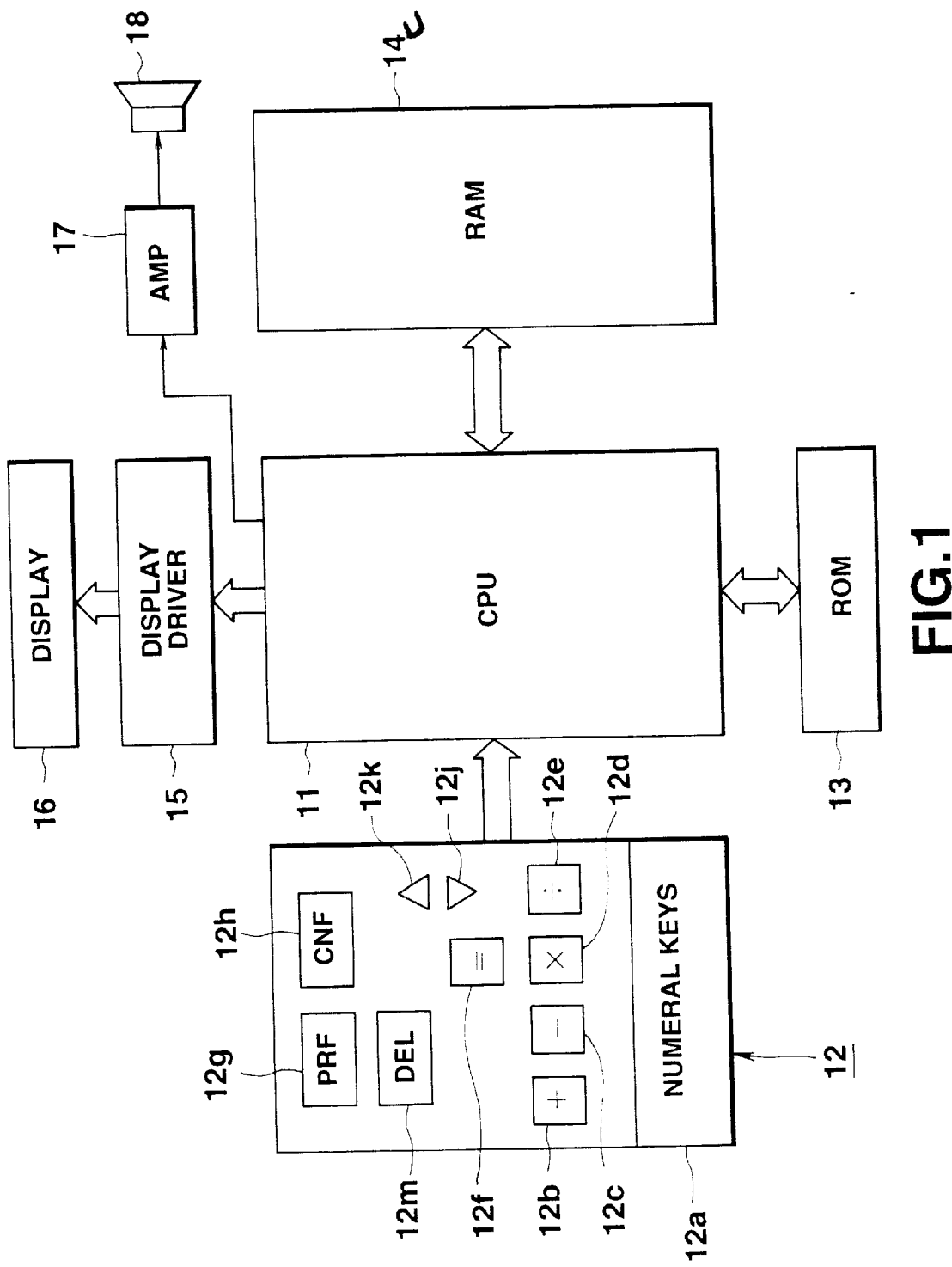
FIG. 1 is a block diagram indicative of the structure of an electronic circuit of a computer as a first embodiment of the present invention.

FIG. 1 is a block diagram indicative of the structure of an electronic circuit of a computer as a first embodiment of the present invention.

The computer includes a CPU 11, which starts up a system program stored beforehand in a ROM 13 in accordance with a key operation signal from a key-in unit 12 to control the operations of the respective circuits of the computer when various calculations are performed. The CPU 11 is connected to the key-in unit 12, ROM 13, a RAM 14 and a liquid crystal display 16 through a display driver 15. The CPU 11 is also connected through an amplifier 17 to a speaker 18.

The key-in unit 12 includes numeral keys and a decimal point key operated to input numerical values of calculation expressions, and function keys to input operator symbols such as "+", "−", "×", "÷", "=": more particularly, numeral ("0"–"9") keys 12a; operator keys including a "+" key 12b, a "−" key 12c, an "×" key 12d, a "÷" key 12e, and a "=" key 12f; the decimal point key (not shown); a proof ("PRF") key 12g operated to set a proof mode; a confirmation ("CNF") key 12h which is operated to selectively display and confirm numerical values and operators as the current input terms of a proving calculation expression input and the corresponding numerical values and operators as the terms of a calculation expression to be proved, in the set proof mode; a "∇" key 12j and a "Δ" key 12k which are operated to selectively display the result of calculation based on the input proving calculation expression in the proof operation and the result of calculation based on the calculation expression to be proved; a delete ("DEL") key 12m which is operated to delete displayed data in the proof operation.

The ROM 13 contains a system program which controls the whole operation of the computer and subprograms such as a regular calculation program, a proof operation program, etc., which provide various calculation modes.

Figure 2:
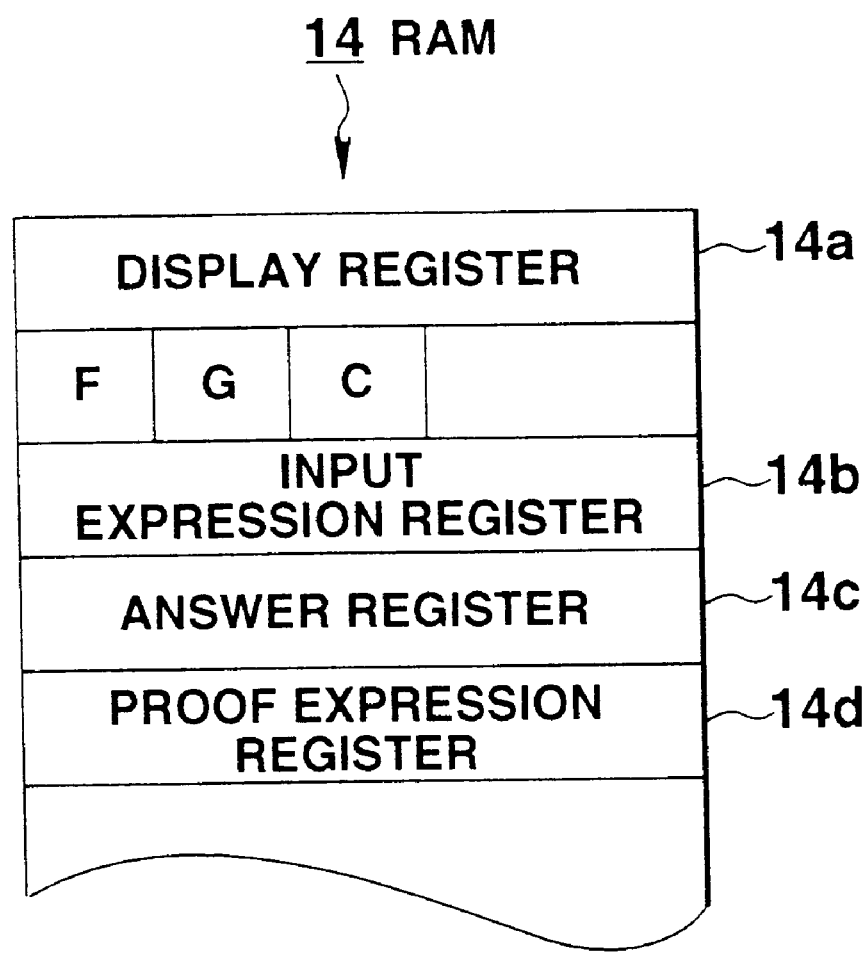
FIG. 2 illustrates the layout of registers in a RAM of the computer.

FIG. 2 illustrates the layout of registers of the RAM 14 of the computer. The RAM 14 includes, for example, a display register 14a in which data to be displayed on the liquid crystal display 16 and including data on a keyed-in numerical value, a function, etc., is written; an input expression register 14b in which the respective input terms which are numerical values and operators of a calculation expression input and written into the display register 14a in accordance with the operations of the numeral keys 12a and various operator keys 12b–12e of the key-in unit 12 are sequentially stored; an answer register 14c which stores the result of the calculation depending on the calculation expression stored in the input expression register 14b; a proof expression register 14d to and in which the calculation expression stored in the input expression register 14b and the result of the calculation stored in the answer register 14c are transferred and stored as a calculation expression to be proved, when a proof mode is set; a proof mode flag register F which is set at "1" in the set proof mode; a confirmation flag register G which is set at "1" in a state where the numerical values and operators of a proving input calculation expression responsive to the operation of the confirmation ("CNF") key 12h are displayed in the set proof mode and set at "0"

in the display state of the numerical values and operators of the calculation expression to be proved; a deletion flag register C which is set at "1" by deleting the numerical values input in the set proof mode, etc.

Figure 3:
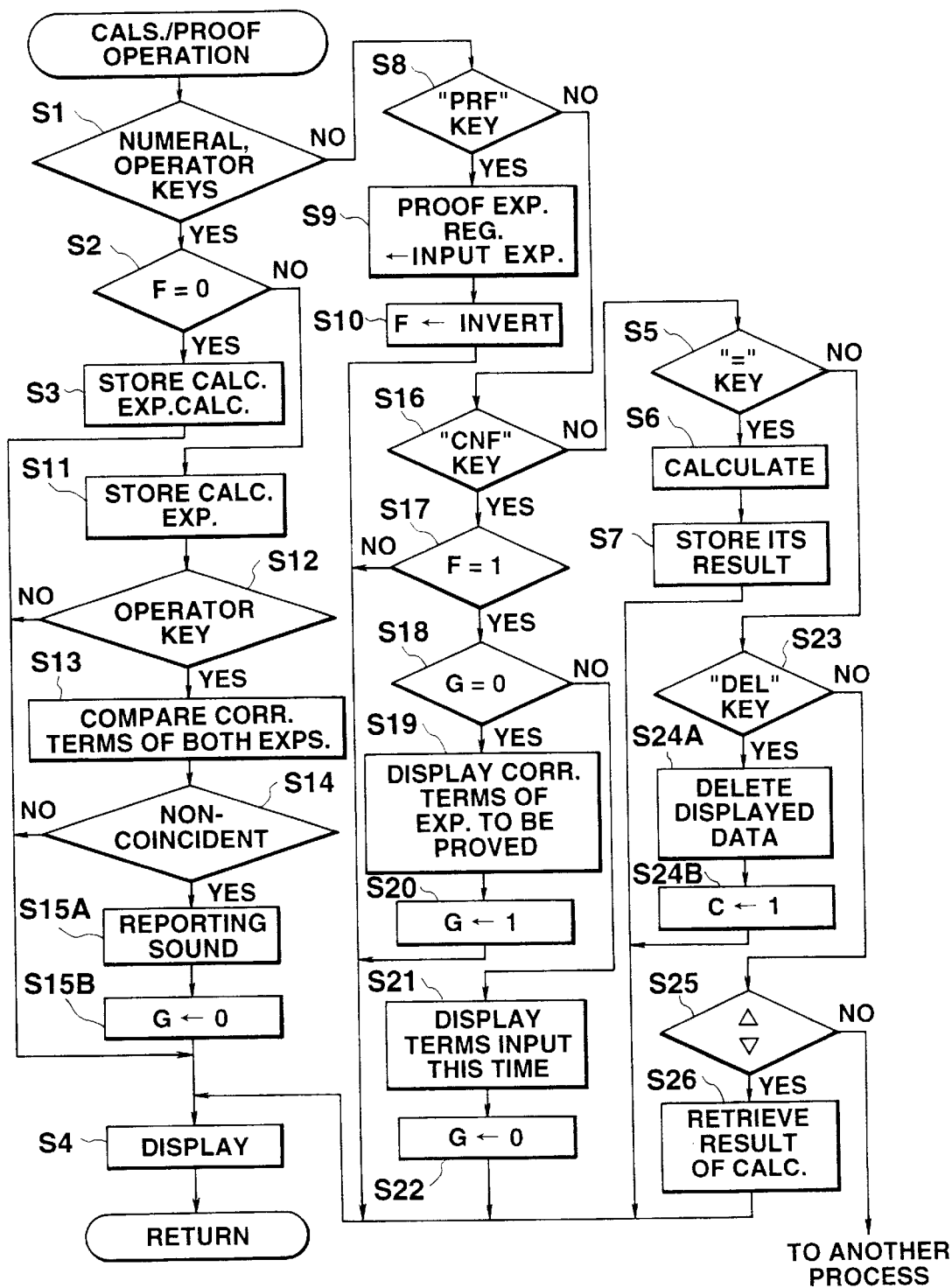
FIG. 3 is a flow chart indicative of a proof and calculation process performed by the computer.

The calculation and proof operation of the computer of this embodiment will be described next. FIG. 3 is a flow chart indicative of the calculation and proof operation which includes a regular calculation and proof operation by the computer.

FIGS. 4(a–4(j) show display operations corresponding to key operations involved in the calculation and proof operation of the computer. For example, when the numerical key 12a and "+" key 12b of the key-in unit 12 are first operated to input "513+" to calculate "513+257+, . . . ,=" when the computer is not in the proof mode (when F is "0"), as shown in FIG. 4(A), the operation of the "+" key is determined at step S1. Thus, control passes to step S2, where it is determined that the proof mode flag register F in the RAM 14 is "0". Thus, at step S3 the numerical value "513" and operator "+" of the input terms are stored in the input expression register 14b. At step S4, "513" and "+" input in the display register 14a are displayed in the liquid crystal display 16.

When "257" shown in FIG. 4(B) is input, this numerical value is written into the display register 14a and displayed on the display 16. When "+" is then input, it is determined that the proof mode flag register F of the RAM 14 is "0", so that the numerical value "257" and operator "+" as the input terms are additionally stored in the input expression register 14b and a numeral "770" which is the sum of "513" and "257" is stored in the answer register 14c and also displayed in the liquid crystal display 16 (steps S1, S2, S3 and S4).

Thereafter, similarly, the respective terms of a desired calculation expression are keyed in to iterate the steps S1–S4 such that the respective input terms (numerical values and operators) of the input calculation expression are sequentially stored in the input expression register 14b and the result of the calculation is stored in the answer register 14c and also displayed on the display 16.

When "=" key 12f is operated in a state where the desired calculation expression has been input, as shown in FIG. 4(C), at step S5 this key operation is detected and at step S6 the end calculation is performed. The result of the calculation "1740" is stored in the answer register 14c and also displayed in the display 16 (steps S7, S4).

In the calculation at step S6 and in the proof mode which is not shown and will be described later, a calculation based on the proof calculation expression is performed to obtain the final result of the calculation, which is then compared with the data in the answer register 14c to determine whether the final result coincides with the data in the register 14c. If non-coincident, this fact is reported.

When the proof ("PRF") key 12g is operated to prove the calculation, the calculation expression stored in the input expression register 14b is transferred and stored as a calculation expression to be proved to and in the proof expression register 14d, the proof mode flag register F is set at "1", and the CPU 11 is set in the proof mode (steps S8, S9, S10). When this register F is set at "1", the CPU 11 displays "PROVING" on the display 16, as shown in FIG. 4(D).

As shown in FIG. 4(D), when "513" is first input to input the proving calculation expression, it is determined that the proof mode flag register F is "1". Thus, the input numerical value "513" is stored in the input expression register 14b. It is then determined that the input data is not operator data. The "513" is then displayed on display 16 (steps S1, S2, S11, S12, S4).

Thereafter, when "+" is input, it is determined that the proof mode flag register F is "1". Thus, the input operator "+" is additionally stored in the input expression register 14b. It is also determined that the input data is the operator data. Thus, the numerical value "513" and operator "+" stored in the input expression register 14b and input as the calculation terms this time are compared with the numerical value "513" and operator "+" as the calculation terms of the calculation expressions (to be proved), transferred to and stored in the proof expression register 14d to determine coincidence/non-coincidence between them. If both coincide, calculation is performed (steps S1, S2, S11, S12, S13, S14).

In this case, since the numerical values and operator "513+" of the proving calculation terms input this time are the same as the corresponding ones of the calculation expression to be proved, coincidence is determined. Thus, the display state "513+" is maintained unchanged (steps S14, S4).

As shown in FIG. 4(E), when the second term "267" of the proving calculation expression is input, it is determined that the proof mode flag register F is "1". Thus, the input numeral "267" is stored in the input expression register 14b. It is also determined that the input data is not on the operator, at which time the input numeral "267" is displayed on the display 16 (steps S1, S2, S11, S12, S4).

As shown in FIG. 4(F), when "+" is input, it is determined that the proof mode flag register F is "1". Thus, the input operator "+" is additionally stored in the input expression register 14b. It is also determined that the input data is operator data. Thus, the numerical value "267" and operator "+" input this time and stored in the input expression register 14b are compared with the numerical value "257" and operator "+" as the calculation terms of the calculation expression (to be proved) transferred and stored in the proof expression register 14d to determine coincidence/non-coincidence between them (steps S1, S2, S11, S12, S13, S14).

In this case, the numerical value and operator "267+" as the proving calculation terms input this time are different from the corresponding numerical value and operator "257+" as the calculation terms of the calculation expression to be proved, so that both are determined to be different or not coincident at step S14. At this time, at step S15A a reporting sound signal "pi, pi, . . . " which reports that wrong data was input is output from the speaker 18 through the amplifier 17 (steps S14, S15).

That is, when the terms of a proving calculation expression are sequentially input, they are marked off with corresponding adjacent operators. It is then determined sequentially whether the calculation terms coincide with the corresponding calculation terms of the calculation expression to be proved. If they are determined to be not coincident, this fact is reported by sound that a mistake has occurred in at least one of those terms. At step S15B the confirmation flag register G is then set at "0".

As shown in FIG. 4(G), when the confirmation ("CNF") key 12h is operated, it is determined that the proof mode flag register F is "1" and that the confirmation flag register G is "0". Thus, the numerical value and operator "257+" as the calculation terms of the calculation expression to be proved for which non-coincidence has been determined at step S14 is displayed and the confirmation flag register G is switched from "0" to "1" (steps S16–S20).

As shown in FIG. 4(H), when the confirmation ("CNF") key 12h is operated repeatedly, it is determined that the proof mode flag register F is "1" and that the confirmation flag register G is "1". Then, the numerical value and operator "267+" as the calculation terms of the providing input calculation expression and determined to be non-coincident at step S14 is displayed and the confirmation flag register G is returned from "1" to "0" (steps S16–S18, S21, S22).

Each time the confirmation ("CNF") key 12h is operated, the numerical values and the operators of the mutually corresponding calculation terms of the proving calculation expression and the calculation expression to be proved are alternately displayed, so that it can be confirmed whether there is a mistake in the input calculation terms of the calculation expression to be proved and for which the first calculation was performed or whether there is a mistake in the input calculation terms of the proving calculation expression.

Assume now that, for example, there is an mistake in the terms of any one of the proving calculation expression and the calculation expression to be proved. In this state, if the delete ("DLT") key 12m is operated in a state in which the numerical value and operator "257+" or "267+" as the input terms is displayed, as shown in FIG. 4(G) or 4(H), this operation is detected at step S23. At step S24A the numerical values and operators "257+" and "267+" as the input terms involved in the mistake are deleted from the proof expression register 14d and input expression register 14b, respectively, so that these registers wait for input correct numerical values and operators. When the proof mode is determined, the flag C is set at "1" at step 24B.

As shown in FIG. 4(J), when a numerical value and operator "257+" as correct calculation terms for the calculation expression to be proved is input to continue the proof operation, it is then determined at step S2 that the proof mode flag register F is "1". At step S11 it is then determined that the flag C is "1". Thus, the input calculation term "257+" is additionally stored in the registers 14d and 14b in place of the calculation terms "257+" and "267+" deleted from the registers 14d and 14b. The calculation of the expression including the numerical value and operator stored in the proof expression register 14d is again performed and the result of this calculation is written into the answer register 14c. Thereafter, the flag C is returned to Thus, the mistake in the calculation expression to be proved or the proving calculation expression is deleted. Thereafter, similarly, determination and confirmation of a possible mistake involved in each of the remaining input terms of both the calculation expressions are repeated.

When the inputting of the proving calculation expression is terminated and the "=" key 12f is operated, the results of the calculations are compared as step S6, as mentioned above. When the results of the calculations are obtained and "∇" key 12j or "Δ" key 12k is selectively operated, the calculation expression (to be proved) stored already in the proof expression register 14d and the proving calculation expression stored in the input expression register 14b are alternately displayed (steps S25, S26).

Thus, when the proving calculation expression is input, the terms of this expression are sequentially compared with the corresponding ones of the calculation expression to be proved. The calculation terms which are not coincident are alternately displayed by the operation of the confirmation ("CNF") key 12h. Thus, it is very easily confirmed which of the calculation expression to be proved or the proving calculation expression contains an input mistake.

Second Embodiment

Figure 5:
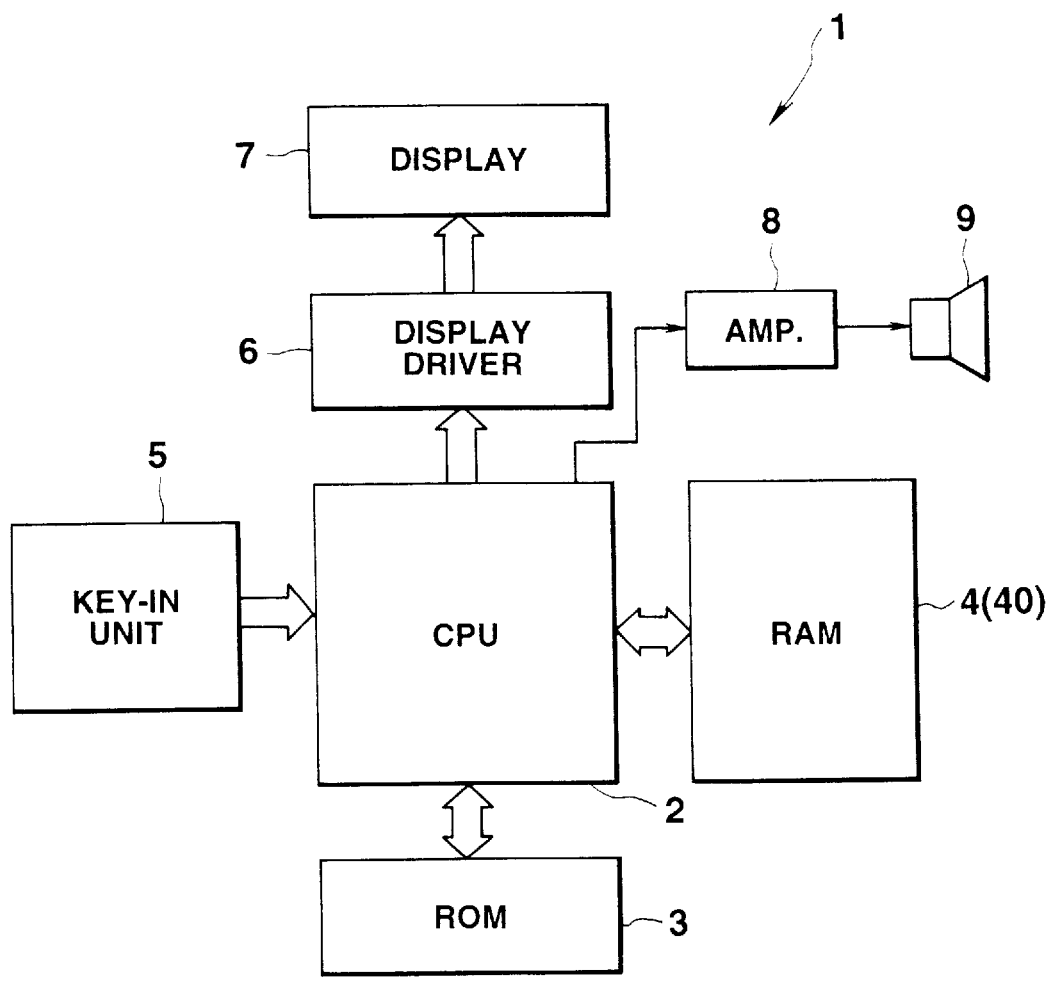
FIG. 5 is a circuit schematic indicative of the basic structure of a computer as a second embodiment of the present invention.

FIG. 5 is block diagram indicative of the basic structure of the computer of this embodiment.

The computer 1 of FIG. 5 is composed of a CPU 2 which controls the whole computer 1 in accordance with program commands, a read only memory (ROM) 3 which contains microprograms processed by the CPU 2, a random access memory (RAM) 4 which stores data, a key-in unit 5 which is used to key in data and select a mode to be described later, a display driver 6 and a display 7 which display numerical data and various message data output from the CPU 2, an amplifier 8 and a speaker 9 which amplify and output a reporting sound signal from the CPU 2.

Figure 6:
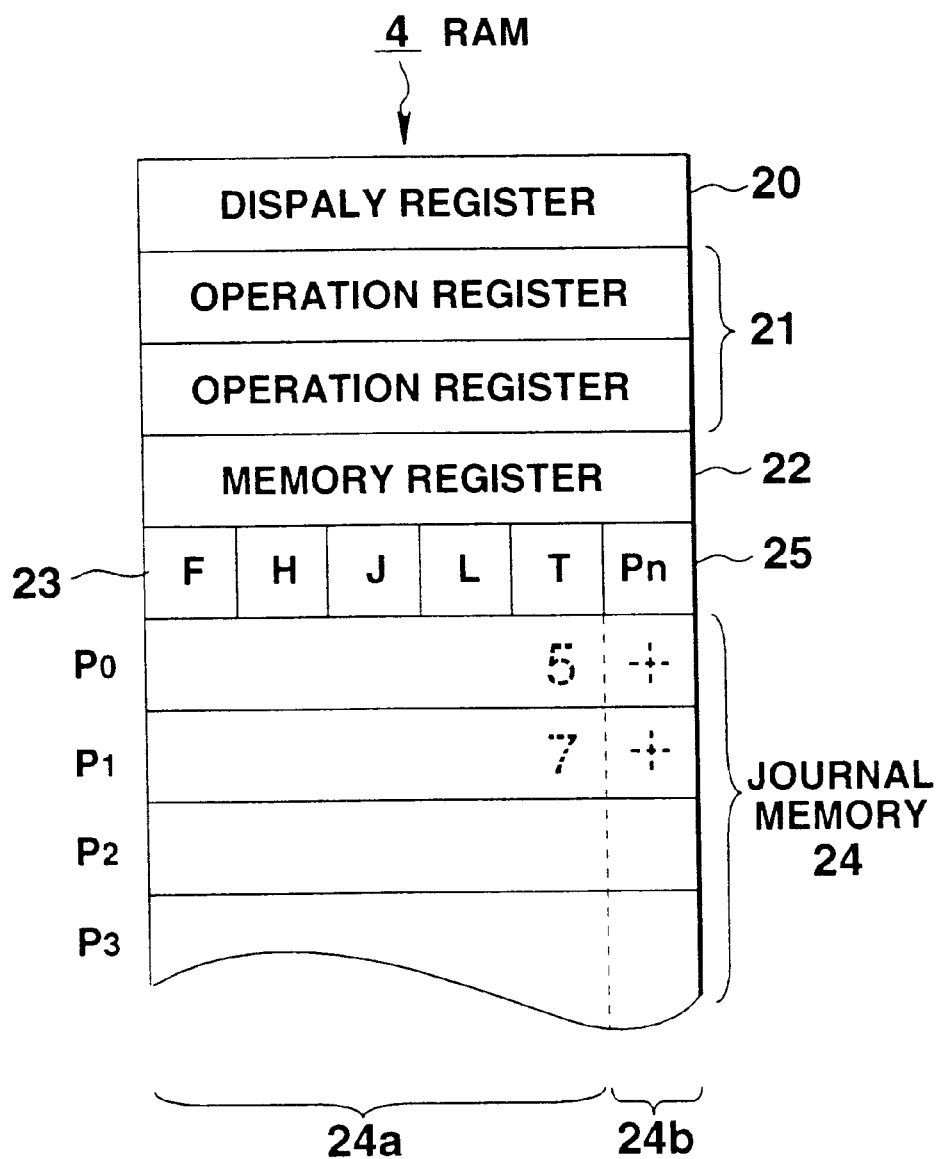
FIG. 6 illustrates the structure of a memory area of the computer as the second embodiment.

As shown in FIG. 6, the RAM 4 includes a display register area 20 (which acts also as an input register area) which stores data to be displayed on the display 7, an operation register area 21 which temporarily stores a numerical value processed by the CPU 2, a memory register area 22 which temporarily stores the result of the calculation, and a flag area 23 which stores the various condition flags F, H, J, L and T indicative of the execution of the respective programs.

The contents of the respective flags are as follows:

F=0: a regular operation mode;
F=1: a proof mode;
H=1: a correction mode;
H=0: release of the correction mode;
J=1: input inhibition (overflow);
J=0: release of the input inhibition;
L=1: timer start;
L=0: timer clear;
T: timer.

RAM 4 includes a journal memory area 24 which temporarily stores the input data from the key-in unit 5, and an address pointer area 25 which stores an address pointer Pn indicative of an address in the journal memory area 24.

The journal memory area 24 includes a register memory area 24 which stores an input numerical value, a function memory area 24b which stores input calculation commands "+", "−", "×", "÷", "=". Sets of numerical data and subsequent calculation command data are sequentially input from the key-in unit and stored sequentially at addresses P0, P1, P2, P3, . . . for calculating purposes.

Figure 7:
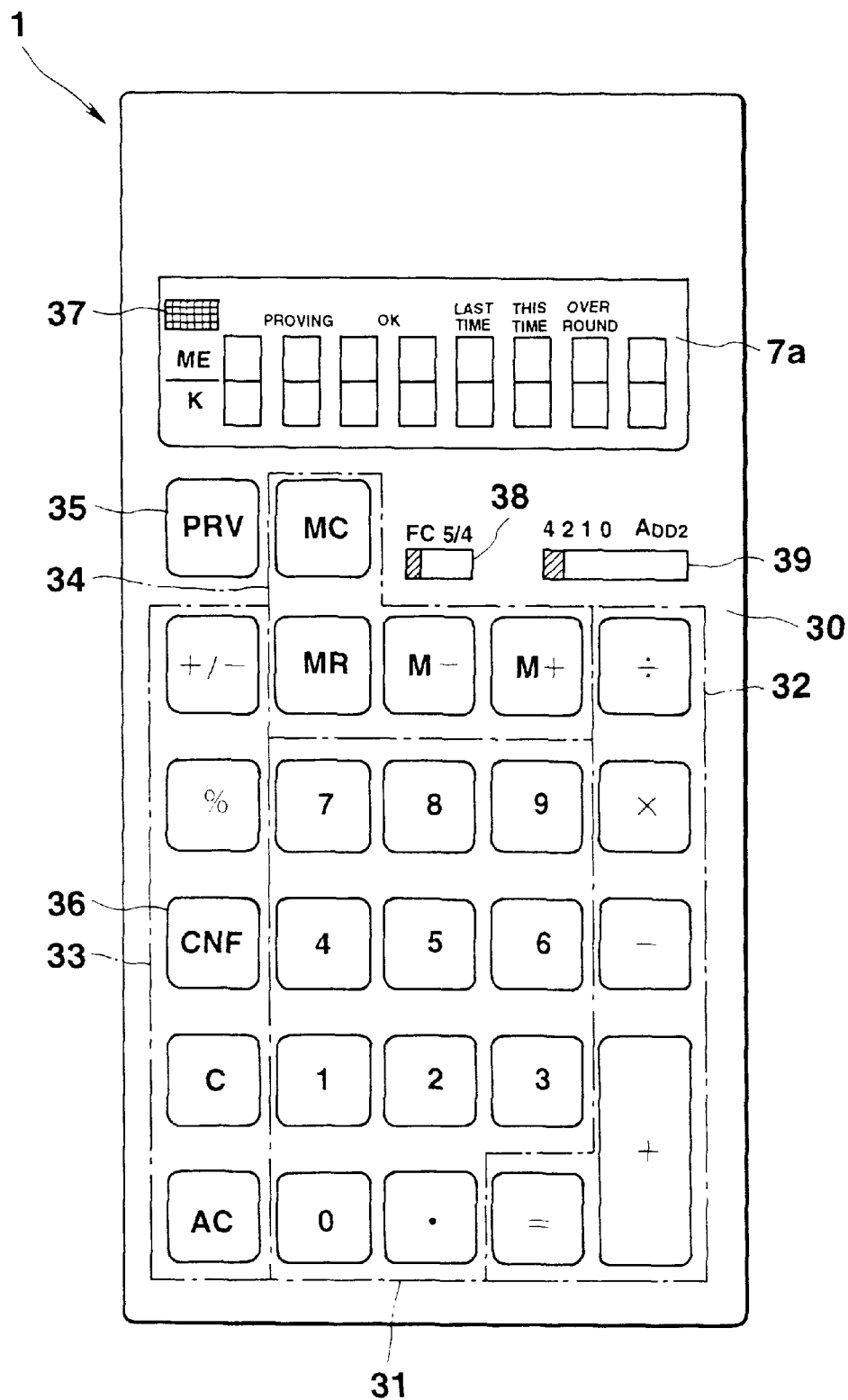
FIG. 7 is a plan view of the computer as the second embodiment.

As shown in FIG. 7, the key-in unit 5 includes a register key group 31, a calculation command key group 32, a command key group 33, a memory key group 34 and a proof ("PRV") key 35, provided on the control panel 30 of the computer 1.

The register key group 31 includes numeral keys "0"–"9" used to input numerical values "0"–"9" and a decimal point key "." to input a decimal point.

The calculation command key group 32 includes calculation command keys "+", "−", "×", "÷" which input the respective calculation commands and an equal "=" key which is used to obtain the answer of the arithmetical operation.

The command key group 33 includes a positive/negative key "+/−" used to change the (positive/negative) sign of a displayed numerical value, a percent key "%" used to select a percent calculation, a confirmation ("CNF") key 36 used to alternately display the results of the calculations performed last time and this time in the proof mode, a clear key "C" used to correct a wrongly keyed-in numerical value, and an all-clear key "AC" used to erase (initialize) all the calculated data obtained so far.

The memory key group 34 includes a memory plus key "M+" used to add (input as a plus numerical value) a displayed numerical value to the numerical value stored in the memory register, a memory minus key "M−" used to subtract a displayed numerical value from the numerical value stored in the memory register, a memory recall key "MR" used to call back a numerical value stored in the memory register, a memory recall/clear key "MC" used to recall the numerical value stored in the memory register and simultaneously erase the content of the memory register.

The proof key "PRV" 35 is a command key used to alternately select a standard calculation mode and a proof mode.

The display 7a is composed of a well-known liquid crystal display. When numerical data/various message data output from the CPU 2 is input to the display driver 6, the display 7a is driven by the driver 6 to display numerical data such as a numerical value and an answer, various message information thereon, as shown in FIGS. 14 and 15.

As shown in FIG. 7, the display window 7a is provided above the input keys on the control panel 30 to display a numerical value of up to eight figures. When there is a numerical value in a memory register of the RAM 4, "M" is displayed; during a constant numeral-based calculation which, for example, includes "c*x" where "c" is any constant numeral, "*" is any one of arithmetic operator symbols such as "+", "−", "×" and "÷", and "x" is any variable, "K" is displayed; and when an input error such as division of any particular number by 0 occurs, "E" is displayed, on the left side of the numerical display area.

Above the numerical value display area, there is a message display areas where messages "PROVING", "OK", "LAST TIME", "THIS TIME", "ROUND", and "OVER" are displayed. In the proof mode, "PROVING" is displayed; "OK" is displayed when the calculation is found to be correct as the result of the proof operation; "LAST TIME" is displayed when the displayed numerical value is the one obtained last time (in the regular calculation mode); "THIS TIME" is displayed when the displayed numerical value is the one obtained this time (in the proof mode); "OVER" is displayed when the memory overflows with data; and "ROUND" is displayed in the proof mode when the state of a round switch 38 or decimal point switch 39 set for the data obtained last time is different from the state of that switch set for the data obtained this time.

An operator symbol display 37 is provided at a left upper corner of the window 7a to display an appropriate one of symbols "+", "−", "×", "÷" of calculation commands input subsequently to the numerical value displayed on the display window 7a.

Provided on the control panel 30 of the computer 1 are the round switch 38 which designates how to process a decimal fraction, and the decimal point designation switch 39 which designates to which decimal places the result of the calculation should be calculated down in correspondence to the designation of the round switch 38.

The round switch 38 can designate any one of a mode "F" in which the result of the calculation is obtained to as many decimal places as desired, a mode "CUT" in which the result of the calculation is obtained to a designated decimal place(s), and a round mode "5/4" in which the result of the calculation is rounded off to a designated decimal place by counting fractions of 0.5 and over as a unit and cutting away the rest.

The decimal designating switch 39 is effective when the round switch 38 designates "CUT" or "5/4" to designate any one of modes "0" which implies performing no calculation down to any decimal places; "1" which implies performing calculation down to one decimal place; "2" which implies performing calculation down to two decimal places; and "4" which implies performing calculation down to four decimal places. In this case, the figure of a decimal place directly below a designated decimal place is rounded (for example, if a second decimal place is designated, the figure of a third decimal place is rounded).

The decimal point designating switch 39 is also capable of designating a fixed decimal point mode "ADD 2" in which a decimal point is put automatically such that a numeral has two decimal places even when the "." key is not depressed.

The operation of the computer of this embodiment will be described next with reference to flow charts of FIGS. 8–13 and FIGS. 14(a)–(g) and 15(a)–(g).

When data is input from the key-in unit 5 after the "AC" key has been depressed, it is first determined whether F=0, i.e., whether the mode is in the regular calculation one, or the proof one, of the register key/function key operation routine (FIGS. 8, 9) (step E1).

When F is 0, it is determined whether the input data is based on the depression of the register key (step E2). If so, its numerical value is stored in the display register 20 and simultaneously displayed in the display window 7a (step E3). When the key-in operation by the register key is repeated any number of times, a numeral of places (up to 8 places) corresponding to the number of times of key-in operation of the register key is displayed in the display window 7a.

When a calculation command key such as "+" or "−" is depressed, it is determined whether J=0, i.e., whether data is inputtable (step E4). If so, the input numerical value and calculation command are stored in the register memory area 24a and function memory area 24b of the journal memory, respectively, designated by the address pointer Pn (initially, Pn=P0) (step E5). Each time this operation is repeated, the address pointer Pn changes to the next address designation Pn+1 (step E6).

It is then determined whether the journal memory 24 has overflown during the calculation (Step E7). If so, "OVER" is displayed in the message display area of the display window 7a (step E8) and the flag J which inhibits the input of data into the journal memory is set at "1" (step E9).

Calculation is then performed on the input data and its answer is displayed in the display window 7a (step E10).

When the proof ("PRF") key 35 is operated, the proof key operation routine (FIG. 10) is performed. At step E11 it is determined whether the current mode is the regular operation mode or the proof mode. If the current operation mode is determined to be the regular calculation mode, first, "PROVING" is displayed in the message display area of the display window 7a (step E12). After the address pointer Pn becomes the initial address designation P0, the flag F becomes "1", which implies the proof mode (step E14).

When the "PRV" key 35 is operated in the current proof mode, the display "PROVING" is erased (step E15) and the mode returns to the regular calculation mode (step E16).

Figure 8:
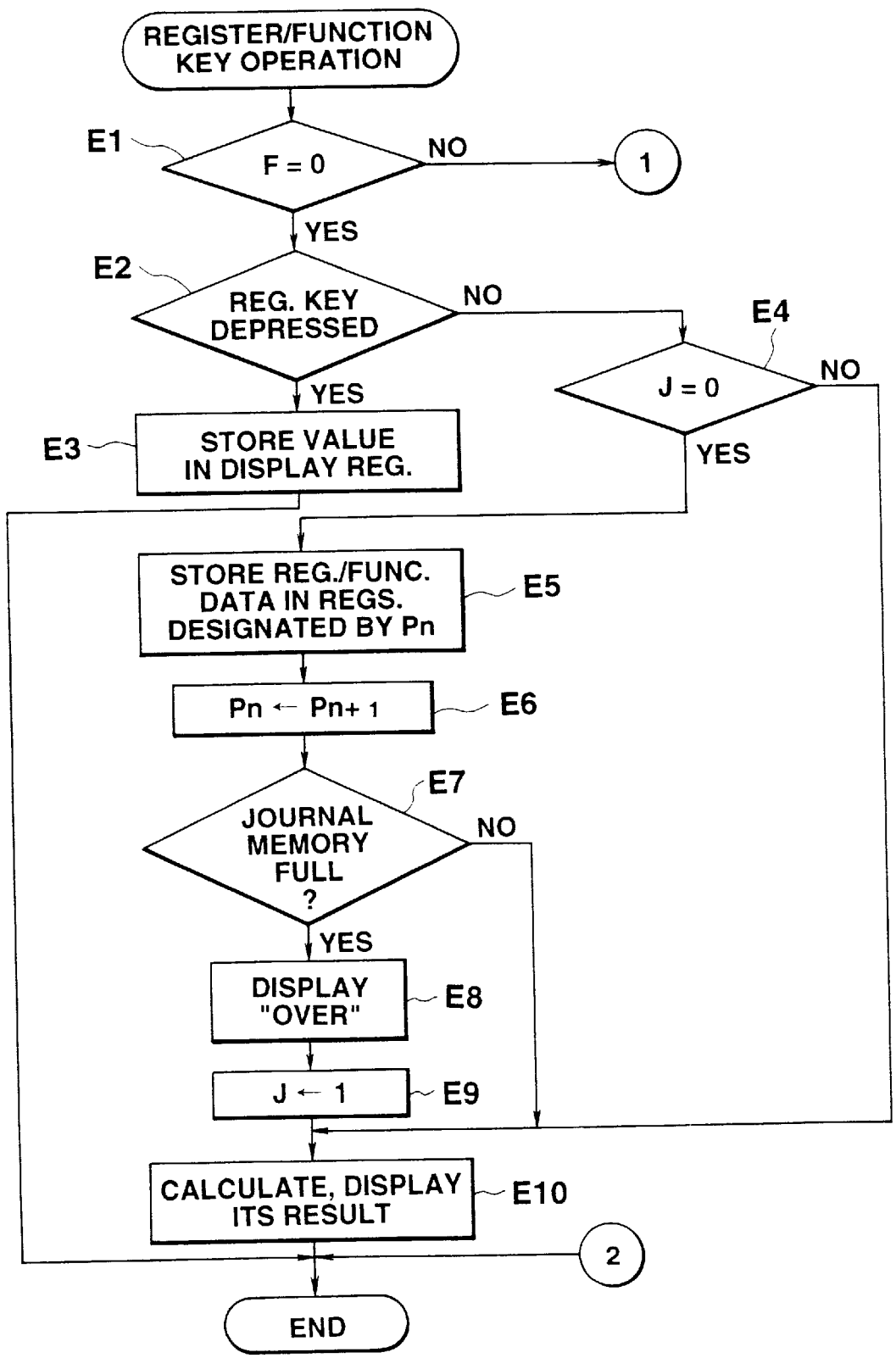
FIG. 8 is a flow chart indicative of an operation (register key/function key operation routine) of the computer as the second embodiment.
Figure 9:
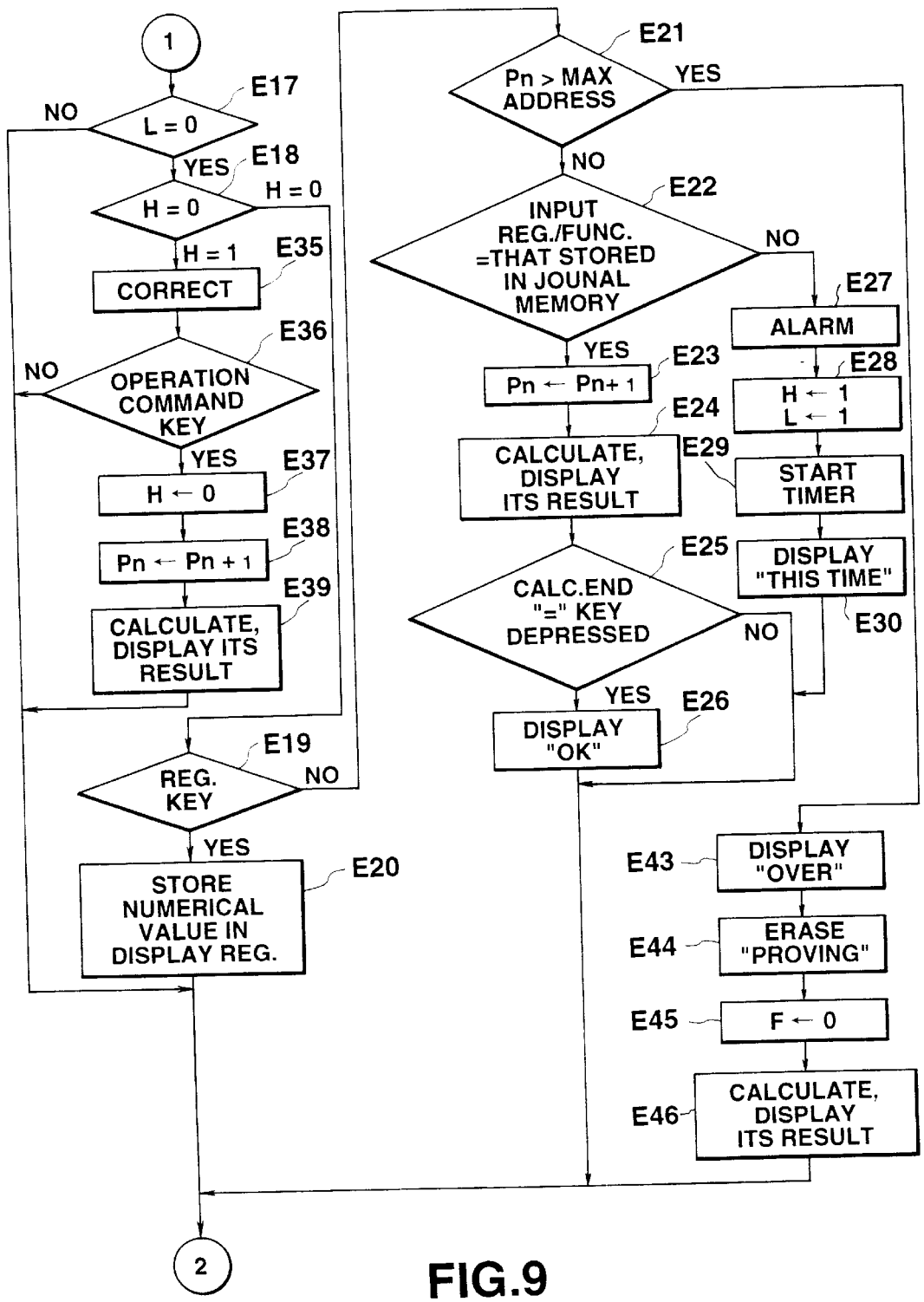
FIG. 9 is a flow chart indicative of an operation (register key/function key operation routine) of the computer as the second embodiment.
Figure 10:
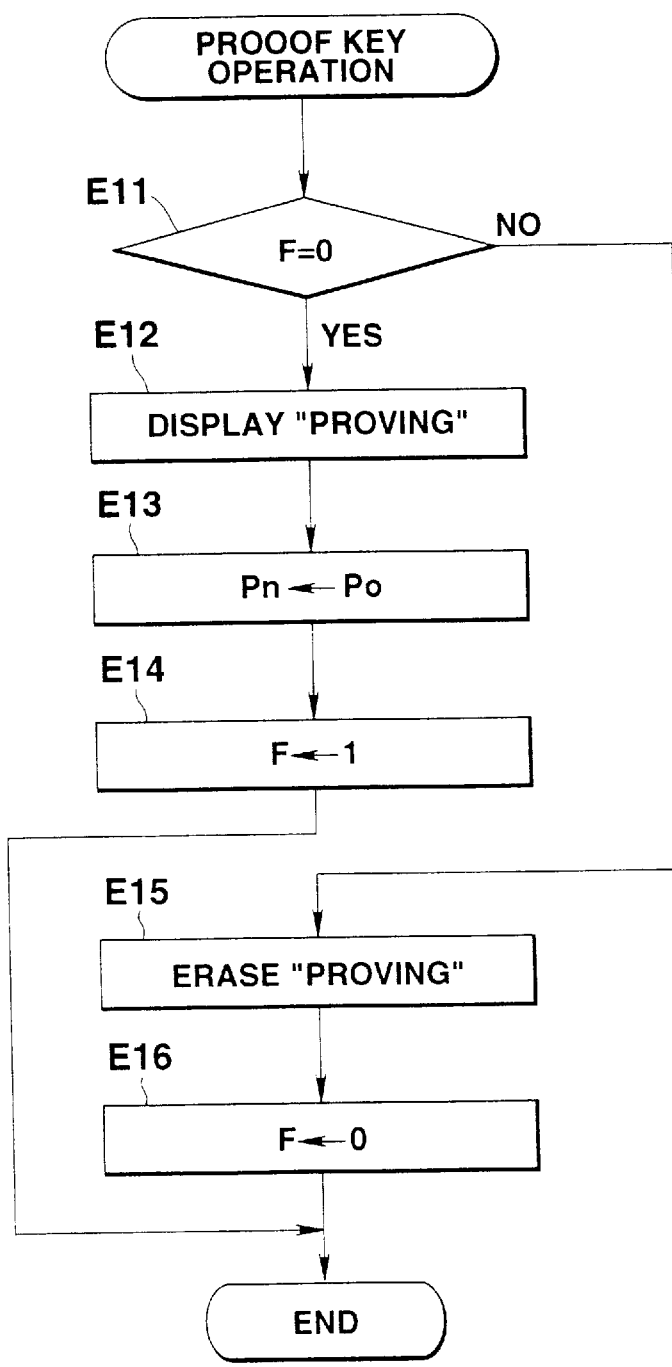
FIG. 10 is a flow chart indicative of a proof key operation routine of the computer as the second embodiment.
Figure 11:
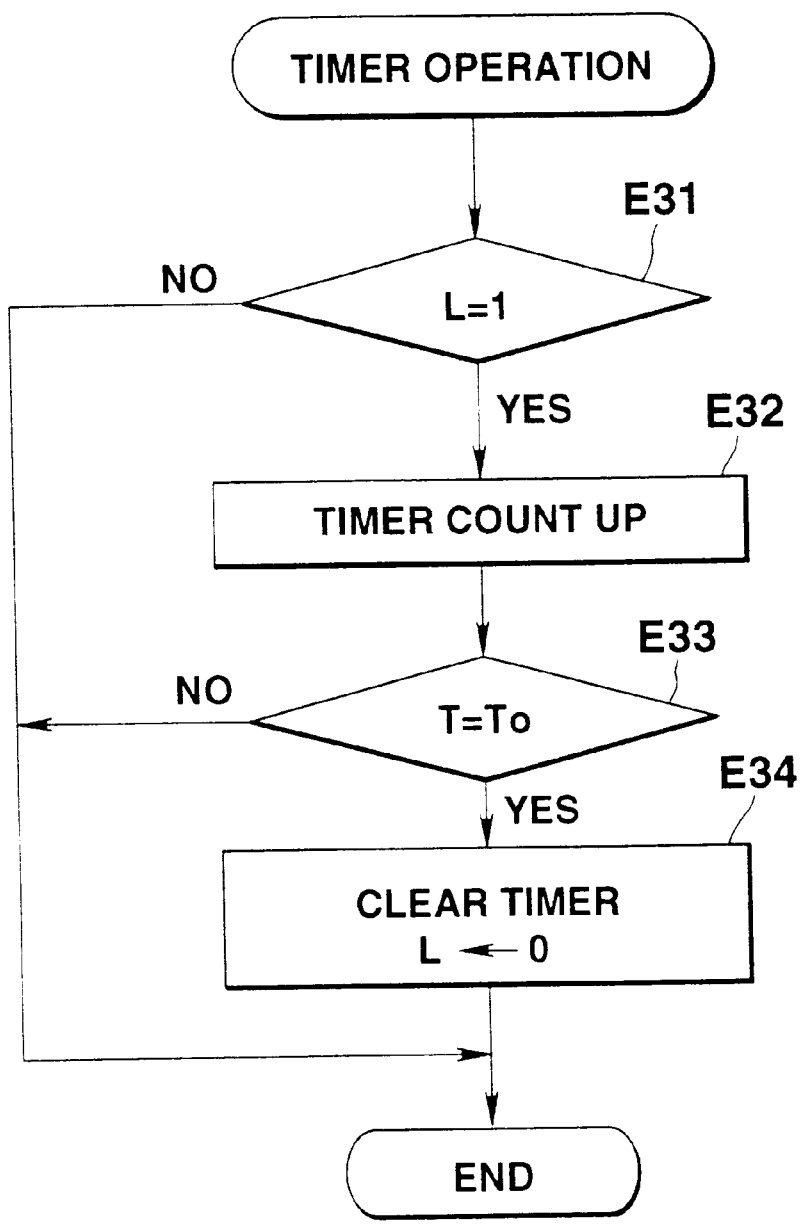
FIG. 11 is a flow chart indicative of an operation (timer operation routine) of the computer as the second embodiment.
Figure 12:
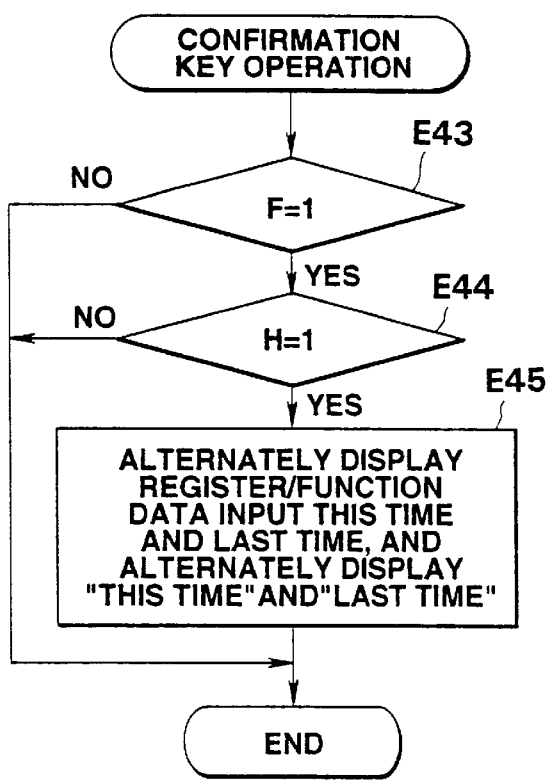
FIG. 12 is a flow chart indicative of an operation (confirmation ("CNF") key operation routine) of the computer as the second embodiment.
Figure 13:
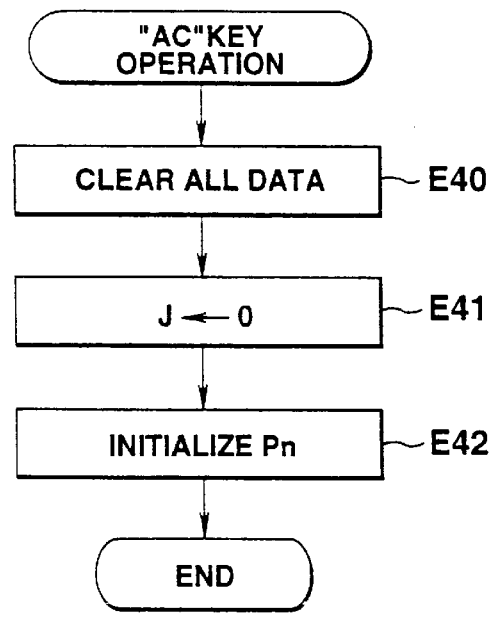
FIG. 13 is a flow chart indicative of an operation ("AC" key operation routine) of the computer as the second embodiment.

In the proof mode, the mode is determined to be the proof mode at step E1 of the register key/function key operation routine (FIGS. 8, 9). At step E17, it is determined whether L=0, i.e., whether the timer has started. If L=0, it is further determined whether H=0, i.e., whether the mode is the correction mode (step E18).

If data is input from the key-in unit 5 when H=0, it is determined whether the input data is based on the operation of the register key (step E19). If so, its numerical value is stored in the display register 20 and displayed in the display window 7a (step E20). By repetition of the input operation by the register key any number of times, a numeral of places (up to 8 places) corresponding to the number of times of input operation of the register key is displayed in the display window 7a.

When it is determined at step E19 that the calculation command key has been operated, it is determined whether the address pointer Pn is beyond the maximum address value (step E21). If not, the input register numeral/calculation command is compared with the register numeral/calculation command stored at the designated address stored last time in the journal memory 24 for proving purposes (step E22).

Each time the input register numeral/calculation command coincides with the stored one, the address pointer Pn becomes the next address designation Pn+1 (step E23), so that the required calculation and the display of the result of the calculation are performed (step E24).

Each time the operations of the register key and calculation command key are repeated, the input register numeral/calculation command is compared with the corresponding one stored at the designated address in the journal memory 24. If both coincide, the required calculation and display of the result of the calculation are performed.

When the "=" key is operated (step E25), the calculation is terminated and "OK" indicating that the calculation was correct is displayed in the message display area of the display window 7a (step E26).

When the input register numeral/calculation command does not coincide with the register numeral/calculation command stored at the designated address in the journal memory 24, an alarm sound is generated from the speaker 9 (step E27).

Thereafter, the flag H becomes "1", i.e., the mode becomes the correction mode, the flag L becomes "1" and the timer starts (steps E28, E29). Directly after the timer starts, "THIS TIME" is displayed in the message display area of the display window 7a.

In the correction mode, it is determined whether L=1, that is, whether the timer should be started, in the timer operation routine (FIG. 11) (step E31). If L=1, the timer operates to start the count-up operation (step E32). When a predetermined time T0 (for example, of 1 second) passes after the counting-up operation started, the flag L becomes "0" to clear the timer (steps E33, E34). During the counting-up operation, the input operation from the key-in unit 5 are all nullified.

When the confirmation ("CNF") key 36 is then depressed, a "CNF" key operation routine (FIG. 12) is executed. The operation of the "CNF" key 36 is effective only when the flag F is "1" (the proof mode) and the flag H is "1" (the correction mode). Each time "CNF" key 33 is depressed, the register numerals and calculation command symbols input last time and this time are alternately displayed and "LAST TIME" and "THIS TIME" "are alternately displayed (steps E43–45).

When a correction input process is performed from the key-in unit 5 after a lapse of predetermined time T0, a correction process is performed at step E35 of the register key/function key operation routine. After correct data which is the same as that input last time is input by the register key and when correct data which is the same as that input last time is then input by the calculation command key, the flag H becomes "0" and the correction mode ends (steps E37).

After the correction process ends, and the address pointer Pn then becomes the next address designation Pn+1 (step S38), the required calculation is performed and the display of the result of the calculation is performed (step E39) and an input enable state results. Thereafter, processes similar to those at steps E17–E24 are performed. When the register number/calculation command input last time coincides with that input this time, the calculation ends. When the "=" key is then depressed (step E25), "OK" is displayed in the message display area of the display window 7a (step E24).

When the "AC" key is depressed, the "AC" key operation routine (FIG. 13) is executed to thereby erase all the data involved in the regular calculation and proof operation (step E40). Thus, the flag J becomes "0" to enable a regular calculation input (step E41) and the address point Pn is returned to the initial address designation P0 (step E42).

When the address pointer Pn indicative of the capacity of the journal memory 24 becomes full during the proof operation, the proof operation becomes impossible to thereby display "OVER" in the message display area of the message window 7a (step E43) and the display "PROVING" is erased (step E44). The flag F then becomes "0" (step E45) and the required calculation and the display of the result of the calculation are performed in the regular operation mode (step E46). After the memory which stores the content of the calculation performed last time is full during the proof operation, no more proof operation is possible, but the calculation process as it is continues.

FIGS. 14(a)–(g) and 15(a)–(g) show illustrative operations of keys in the key-in unit 5 and corresponding illustrative displays on the display 7a in a side-by-side relationship. The operation of FIG. 14(a) shows an illustrative operation performed in the regular calculation mode. The operations of FIGS. 14(b)–(c) show illustrative ones in the proof mode in which it is proved whether the calculation in FIG. 14(a) was correct.

In FIG. 14(a), after the "AC" key is depressed (at steps E40–E42), a series of key depressions for "5", "+", "7", . . . was performed and the "=" key was depressed finally to display a numeral "27" indicative of the result of the calculation in the display window 7a (step E1–E10).

In FIG. 14(b), "PROVING" and "THIS TIME" are displayed in the message display area of the window 7a by the depression of the proof ("PRV") key (step E11–E14), the same key depressions as those performed last time are performed up to the "5" and "+" keys. An "8" key which is different from the corresponding numeral key depressed last time is then depressed and the "+" key is operated to thereby display "THIS TIME" and "+" (steps E19, E21, E22, E27–E30). At this time, the speaker 9 generates an alarm sound "pi, pi, . . . " and the proof mode is selected and the timer starts. During the proof operation, the alarm sound is produced at the wrong input data to thereby detect the error immediately.

In FIG. 14(c), the "2" key has been depressed. At this time, the count of the timer is not one (second). Thus, the key operation is neglected any longer and "8" has been still displayed in the display window 7a (steps E31–E35).

As described above, when a wrong key is depressed during the proof operation, the subsequent input is then nullified for a given time to thereby prevent wrong data from being input in the proof mode.

In FIG. 14(d), since the confirmation ("CNF") key 36 has been operated, the value "7" input last time is displayed and "LAST TIME" is displayed in the message display (steps E43–E45).

In FIG. 14(e), since the "CNF" key 36 has been again depressed, "8" input this time is display and "THIS TIME" is displayed in the message display (steps E43–E45).

As described above, the values input last time and this time are alternately displayed by depression of the "CNF" key 36, so that a possible difference between data input last time and this time is proved.

In FIG. 14(f), since the correct "7" and "+" keys were depressed, a correct calculation value "12" is displayed at that time (steps E35–E37).

In FIG. 14(g), the key-in operations were performed subsequently and the "=" key was operated finally, so that the correct answer "27" is displayed. Simultaneously, "OK" is displayed in the message display.

As just described above, since the message "OK" indicating that the correct calculation has been performed is displayed, the termination of the proof operation is easily confirmed to thereby greatly improve operability.

FIG. 15(a)–(c) show other illustrative key-in operations in the regular calculation mode while FIGS. 15(k)–(n) show further illustrative operations in the proof mode.

In FIG. 14(a), after the "AC" key was depressed (steps E40–E42), the "2", "30", "" and "+" keys were depressed to thereby display an intermediate calculation value "5" and "+" (steps E1–E7, E10).

In FIG. 15(b), after a series of key-in operations subsequent to the key-in operations of FIG. 15(a) was performed, the journal memory was full (Step E7) when the "2", "3", "+" keys were depressed. Thus, "OVER" is displayed in the message display (step E8) and the intermediate calculation value "503" is displayed (step E10).

In FIG. 15(c), after a series of key-in operations subsequent to the key-in operation of FIG. 15(b) was performed, the "1" and "5" keys were depressed and the "=" key was depressed finally. Thus, a numeral "627" indicative of the result of the calculation is displayed in the display window 7a (steps E1–E10). The "OVER" is left displayed.

In FIG. 15(d), since the proof ("PRV") key was depressed, the "PROVING" is displayed in the message display area of the display window 7a (steps E11–E14). Since "2", "+", "3" and "+" keys were depressed as done last time, the intermediate calculation value "5", and "+" are displayed (steps E1, E17–E20).

In FIG. 15(e), when the same series of key-in operations as that performed last time and subsequent to the key-in operations of FIG. 15(d) was performed and the "2", "3" and "+" keys were depressed, the journal memory became full. Thus, "OVER" is displayed in the message display (steps E43) and the intermediate calculation value "503" is displayed.

In FIG. 15(f), when the "1" key was depressed subsequently to the key-in operation of FIG. 15(e), the journal memory overflowed. Thus, the "OVER" was displayed and the display "PROVING" disappeared (steps E43, E44). In addition, the "1" and "+" keys were depressed and the intermediate calculation value "514" is displayed (steps E45, E46).

In FIG. 15(g), after a series of key-in operations subsequent to the operation of FIG. 15(f) was performed, the "1" and "5" keys were depressed and the "=" key was finally depressed. Thus, a numeral "625" indicative of the result of the calculation is displayed in the display window 7a (step E10). Also, in this case, the display "OVER" remains.

As described above, when the journal memory overflows, the proof mode is released and the subsequent operations are performed in the regular calculation mode. Thus, the inconvenience of interrupting the proof operation each time the overflow occurs is avoided.

Since "OVER" is displayed, that the calculations performed before the overflow occurred are correct is confirmed. Thus, the user can take attention only to the subsequent key-in operations and confirm the result of the calculation to thereby prove the calculation.

The inventive computer is not limited to the above compositions. While, for example, in the present embodiment, the values input last time and this time are alternately displayed by depressing the confirmation ("CNF") key 36, the values input last time and this time may be automatically displayed alternately at predetermined intervals of time when there is a wrong input during the proof operation. After the wrong data is input, the time for which the keyed-in data is nullified may be less or more than one second.

Alternately, data keyed-in by other keys may be nullified until the confirmation ("CNF") key 36 is depressed in place of nullifying the input for a given time after the wrong data is input.

Third Embodiment

Since the basic structure and appearance of the third embodiment of the inventive computer are the same as those of the second embodiment (FIGS. 5–7) except for the internal structure of a RAM and its processing operation, only the internal structure of the RAM and its processing operation will be described next.

Figure 16:
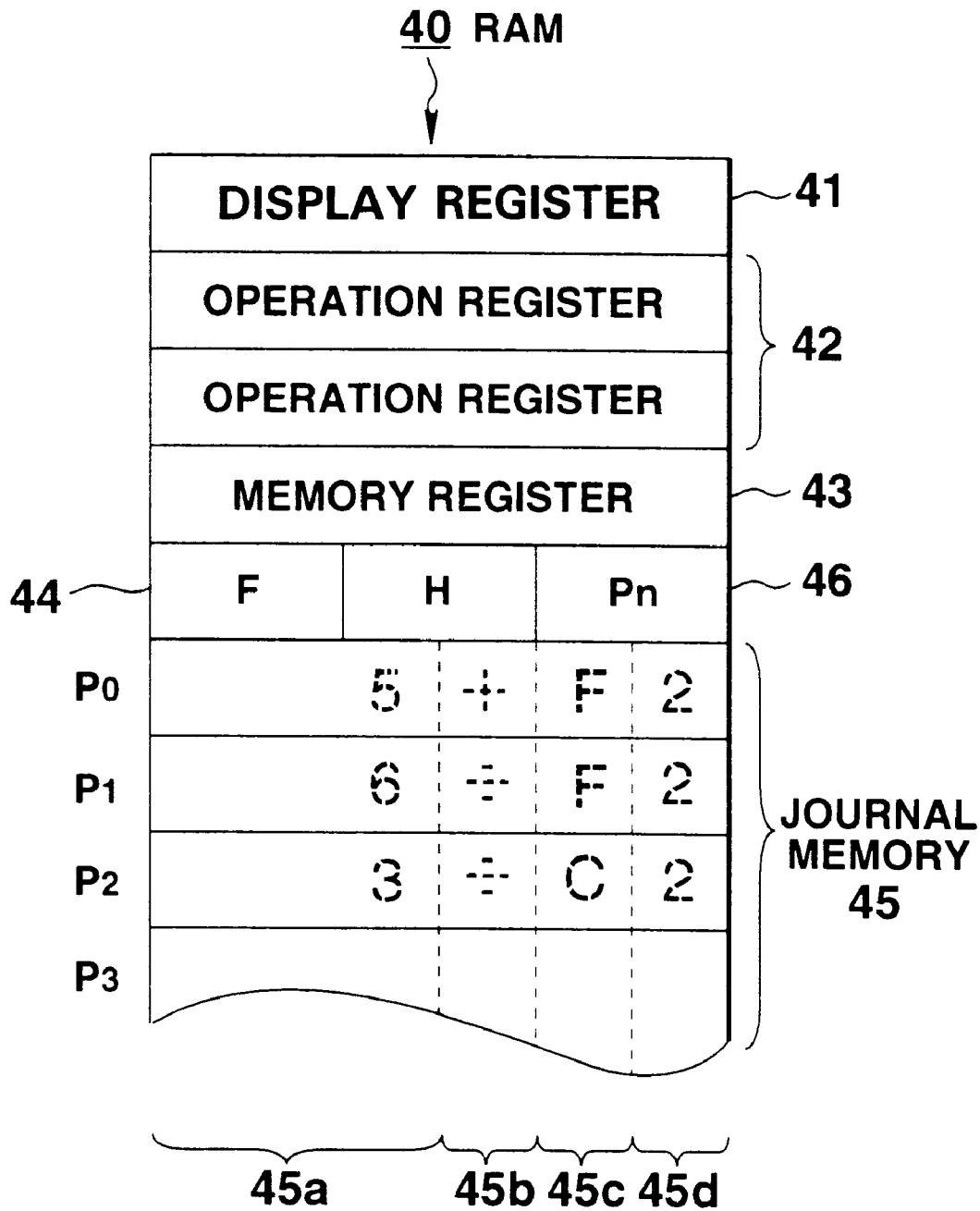
FIG. 16 illustrates the structure of a memory area of the computer as a third embodiment.

As shown in FIG. 16, the RAM 40 of the third embodiment includes a display register area 41 which stores data displayed on the display 7a and also functions as an input register area, an operation register area 42 which temporarily stores numerical values calculated by the CPU 2, a memory register area 43 which temporarily stores the result of the calculation, and a flag register area 44 which stores the contents of flags F, H indicative of various conditions during the execution of the programs.

The contents of the respective flags are as follows:

F=0: a regular operation mode;
F=1: a proof mode;
H=1: a correction mode; and
H=0: release of the correction mode.

RAM 40 includes a journal memory area 45 which temporarily stores the input data from the key-in unit 5, and an address pointer area 46 which stores an address pointer Pn which points out a respective one of the registers in the journal memory area 45.

The journal memory area 45 includes a register memory area 45a which stores an input numerical value, a function memory area 45b which stores a respective one of input calculation commands "+", "−", "×", "÷", and "=", a rounded state memory area 45c which stores round state designating data (F, C or 5/4) designated by a round switch 38, and a place designating memory area 45d which stores place designation data (4, 2, 1, 0, ADD2) designated by a decimal point designation switch 39. Each time the key-in unit 5 keys in a set of numerical data, calculation command data input directly after the numerical data, and round state data (round state designation data, place designation data) at that time, this set of data is stored at a respective one of register locations of the journal memory area 45 designated sequentially by address pointers P0, P1, P2, P3, . . . .

The key-in unit 5 has a structure similar to that of the second embodiment and, as shown in FIG. 7, includes a register key group 31, a calculation command key group 32, a command key group 33, a memory key group 34, a proof key 35, a round switch 38 and a decimal point designation switch 39, each provided on the control panel 30 of the computer 1.

As shown in FIG. 7, the display window 7a is provided above the input keys of the control panel 18 to display a numerical value of up to eight places. When there is a numerical value in the memory register of the RAM 4, "M" is displayed on the left side of the numerical display area; "K" is displayed during a constant-based calculation; and when an input error such as division of any particular number by 0 occurs, "E" is displayed.

There are display areas for messages "PROVING", "OK", "LAST TIME", "THIS TIME", "ROUND" above the numerical value display area. Especially, the message "ROUND" is displayed when the states in which the decimal point designation switch 37 and round switch 38 are set in the calculation performed this time in the proof operation are respectively different from the states in which the decimal point designation switch 37 and round switch 38 was set in the calculation performed last time.

The operation of the computer of this embodiment will be described next with reference to flow charts of FIGS. 17–21 and FIGS. 22(a)–(g).

Figure 17:
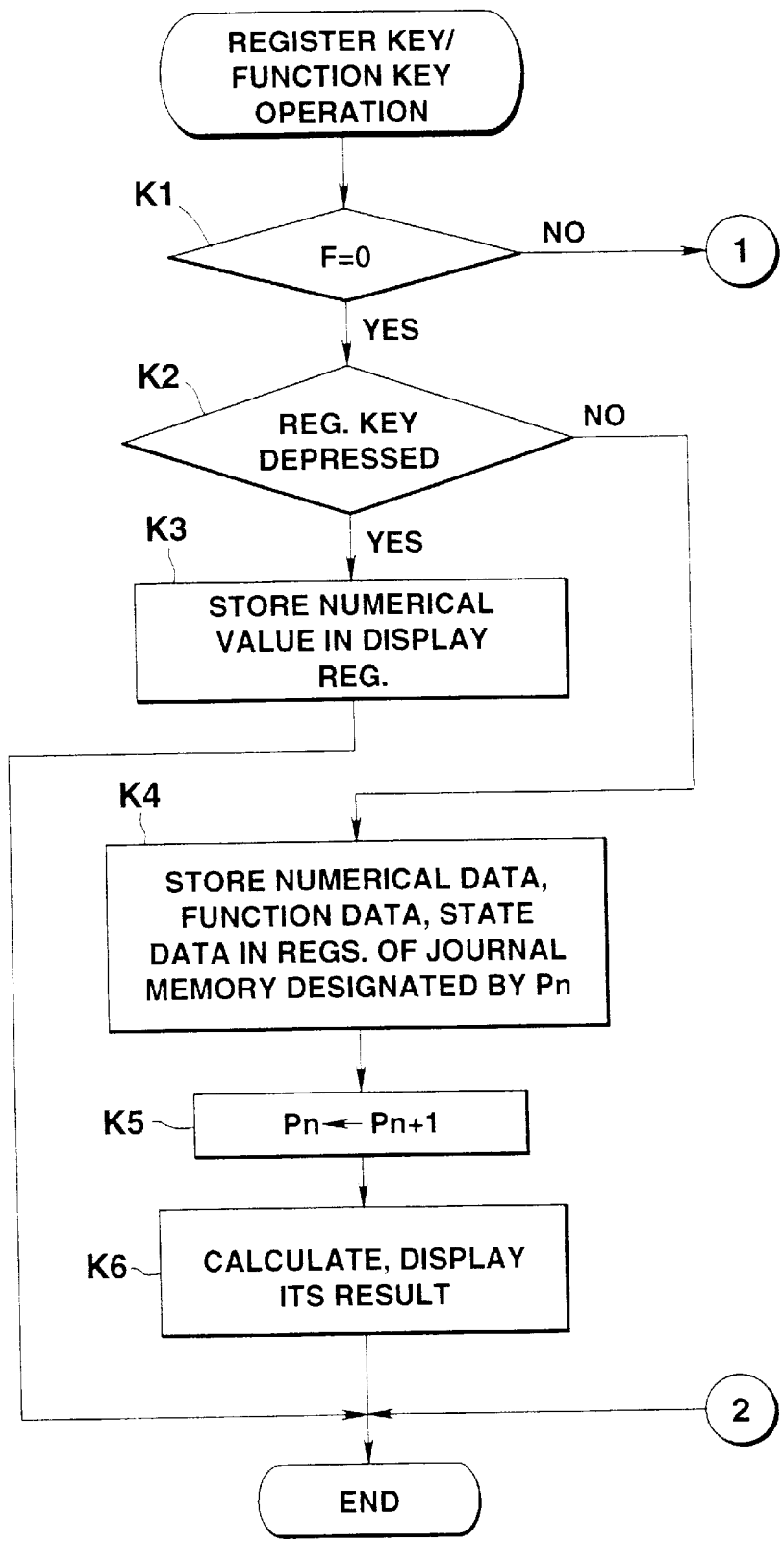
FIG. 17 is a flow chart indicative of an operation (register key/function key operation routine) of the computer as the third embodiment.
Figure 18:
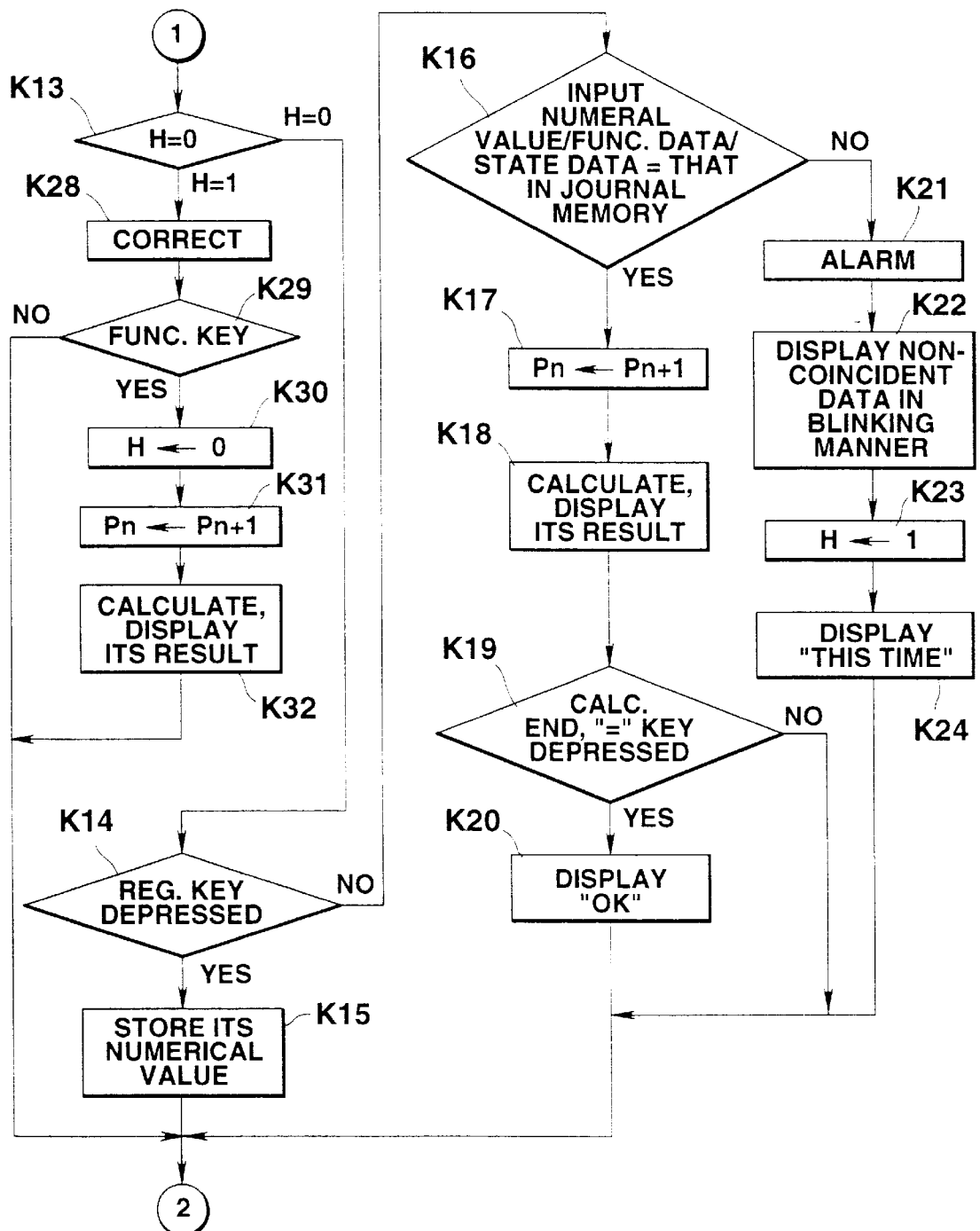
FIG. 18 is a flow chart indicative of an operation (register key/function key operation routine) of the computer as the third embodiment.
Figure 19:
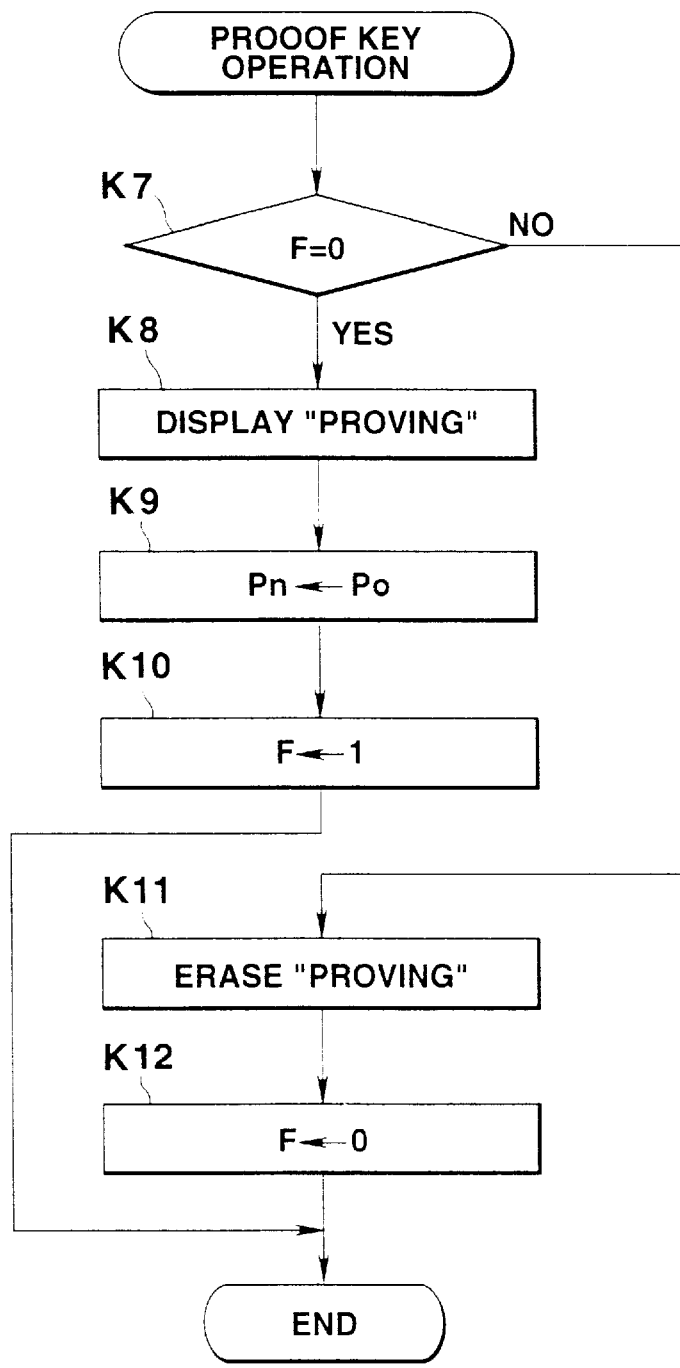
FIG. 19 is a flow chart indicative of an operation (proof key operation routine) of the computer as the third embodiment.
Figure 20:
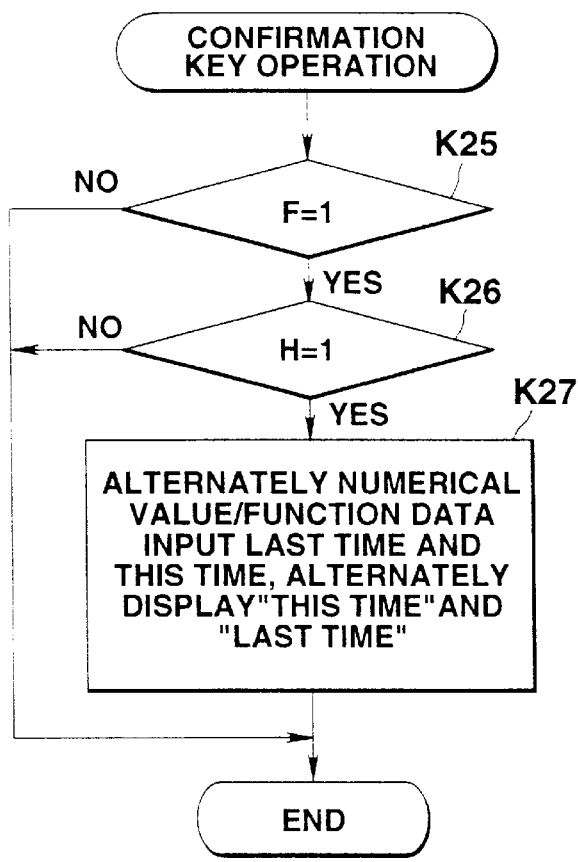
FIG. 20 is a flow chart indicative of an operation (confirmation ("CNF") key operation routine) of the computer as the third embodiment.
Figure 21:
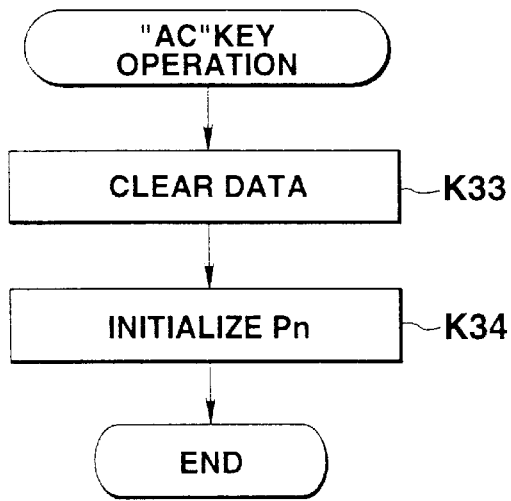
FIG. 21 is a flow chart indicative of an operation ("AC" key operation routine) of the computer as the third embodiment.

When data is input from the key-in unit 5 after the "AC" key is depressed, it is first determined whether F=0, i.e., whether the mode is in the regular operation one or the proof one in the register key/function key operation routine of FIGS. 17 and 18 (step K1).

When F is 0, it is determined whether the input data is based on the depression of the register key (step K2). If so, the input numerical value is stored in the display register 41 and simultaneously displayed in the display window 7a (step K3). When the key-in operation by the register key is repeated any number of times, a numeral of places (up to eight places) corresponding to the number of times of key-in operation of the register key is displayed in the display window 7a.

When a calculation command key such as the "+" or "−" key is depressed, the keyed-in numeral data (5, 6, 3, 2 or 1), calculating command data ("+", "−", "×" or "÷"), round state designating data (F, C or 5/4) at that time, and place designating data (4, 2, 1, 0 or ADD2) are respectively stored in the register memory area 45a, function memory area 45b, round state memory area 45c and place designating memory area 45d of the journal memory area 45 designated by the address pointer Pn (initially, Pn=0) (step K4).

Each time this operation is repeated, the address pointer Pn sequentially points out the next address designation Pn+1 (step K5) and the required calculation and display of the result of the calculation are performed (step K6). When the "=" key is then operated, the answer is displayed in the display window 7a.

When the proof ("PRV") key 35 is operated, the proof key operation routine (FIG. 19) is performed. First, "PROVING" is displayed in the message display area of the display window 7a (step K8). After the address pointer Pn points out an initial address designation P0, the flag F becomes "1" and hence the operation mode changes to the proof mode (steps K9, K10).

When the "PRV" key 35 is depressed in the proof mode, the display "PROVING" disappears (step k11) and the mode returns to the regular calculation mode (step k12).

In the proof mode, it is first determined whether H=0, i.e.,whether the operation mode is the correction mode in the register key/function key operation routine (FIGS. 17, 18) (at step K13).

When data is input from the key-in unit 5 when H=0, it is determined whether the input data is based on the depression of the register key (step K14). If so, its numerical value is stored in the display register 41 and also displayed in the display window 7a (step K15). By repeating the key-in operation by the register key any number of times, a numeral of places (up to 8 places) corresponding to the number of times of key-in operation by the register key is displayed in the display window 7a.

When the calculation command key is then operated, the numerical value/calculation command/rounding operation state data input this time is compared with the numerical value/calculation command/rounding operation state data stored last time in the register of the journal memory area 45 pointed by Pn (step K16).

When the numerical value/calculation command/ rounding operation state data input this time is coincident with that stored last time in the register of the journal memory area 45, the address pointer Pn points out the next address designation Pn+1 (step K17), so that the required calculation and the display of the result of the calculation are performed (step K18).

Each time the operation of the register key and calculation command key is repeated, the input numerical value/ calculation command/rounding operation state data is compared with the numerical value/calculation command/ rounding operation state data stored at the designated address designated by Pn in the registers of the journal memory area 45. When both coincide, the required calculation and display of the result of the calculation are performed (steps K16–K18).

When the "=" key is operated, the calculation is terminated (K19) and "OK" indicating that the calculation was correct is displayed in the message display area of the display window 7a (step K20).

When the input numerical value/calculation command/ rounding operation state data is not coincident with the numerical value/calculation command/rounding operation state data stored last time in the register of the journal memory area 45 designated by Pn, an alarm sound is generated from the speaker 9 (step K21) and the input data is displayed in a blinking manner in the display window 7a (step K22). (If the round switch has been set wrongly, "ROUND" is displayed in a blinking manner.)

Thereafter, the flag H becomes "1", i.e., the operation mode becomes the correction mode (step K23), "THIS TIME" is displayed in the message display area of the display window 7 (step K24).

When the confirmation ("CNF") key is depressed in the correction mode, a "CNF" key operation routine (FIG. 20) is executed. The operation of the "CNF" key is effective only when the flag F is "1" (the proof mode) and the flag H is "1" (correction mode). When the "CNF" key is depressed repeatedly, the numerical values and calculation command symbols input last time and this time are alternately displayed and "LAST TIME" and "THIS TIME" are alternately displayed (steps K25–K27).

When correct numerical data which is the same as the data input last time is input by the register key, and correct calculation command data which is the same as the data input last time is input by the calculation command key (steps K28, K29), the flag H becomes "0" and the correction mode is terminated (step K30).

Then, after the address pointer Pn points out the next address designation Pn+1 (step K31), the required calculation and the display of the result of the calculation are performed (step K32).

Thereafter, processes similar to those at steps K13–K18 are performed. If the "=" key is depressed when the numerical value/calculation command/rounding state data input last time and this time coincides all with each other (step K19), "OK" is displayed in the message display area of the display window 7a (step K20).

When the "AC" key is then depressed, the "AC" key operation routine (FIG. 21) is executed to thereby erase all the data on the regular calculation and proof operation (step K33), the address point Pn is returned to the initial address designation P0 (step K34), and a regular operation input wait state results.

FIGS. 22(a)–(g) show illustrative set states of the round switch 38 and decimal point designation switch 39, illustrative key operations performed at the key-in unit 5, and illustrative displays on the display window 7 performed at those times. FIGS. 22(a)–(c) show illustrative operations in the regular operation mode and FIGS. 22(d)–(g) show illustrative operations in the proof mode performed subsequently to the operations of FIGS. 22(a)–(c).

In FIG. 22(a), a calculation value "11" is displayed in the display window 7a as the result of the sequential depressions of the "5", "+", "6" and "÷" keys in a state in which the round switch 38 is set in the free mode "F" and the decimal point designation switch 39 is set in a two-place mode "2". The operator symbol "÷" of the calculation command key depressed finally at this time is displayed in the operator symbol display 37 of the window 7a.

In FIG. 22(b), as a result of the sequential depressions of the "3" and "÷" keys subsequently to the operations of FIG. 22(a) after the round switch 38 is placed in the cut mode "C", a value "3.66" (obtained by discarding the third decimal place and on of the calculated value) and the operator symbol "÷" are displayed.

In FIG. 22(c), the round switch 38 was placed in the round mode "5/4" and the decimal point designation switch 39 was placed in the one-decimal place mode "1".

The "2", "." and "1" keys were depressed subsequently to the operations in FIG. 22(b), and the "=" key was finally depressed, so that a numerical value "1.7" indicative of the result of the calculation was obtained and displayed (steps K1–K6).

In FIG. 22(d), "PROVING" is displayed in the message display area of the display window 7a by the depression of the proof ("PVF") key 35 (steps K7, K8). Thereafter, the "5", "+", "6" and "÷" keys were sequentially depressed as done last time, so that a calculation value "1.1" is obtained and displayed (steps K13, K14, K16–K18).

In FIG. 22(e), the round switch 38 was set in the same cut mode "C" as done set last time, but the decimal point designation switch 39 was set in the one-decimal place mode "1" which was different from that set last time. Thus, the "3" key was depressed subsequently to the depressions of the keys in FIG. 22(d), and the "÷" key was operated. At this time, the speaker 9 temporarily generates a reporting sound "pi, pi, . . . " and a blinking "ROUND" is displayed in the message display area of the display window 7a (steps K16, K21, K22).

As just described above, when the operations are performed in a round state different from that set last time is performed, an alarm sound is generated and display indicative of a wrong operation is displayed in a blinking manner to thereby immediately inform the user that there is a mistake in the designation of the round operation state.

In FIG. 22(f), the decimal point designation switch 39 is set again in the two-decimal place mode "2" which is the same as that set last time, so that a correct calculation value "3.66" is obtained and displayed.

In FIG. 22(g), the round switch 38 was set in the round-off mode "5/4" which was the same as that set last time, and the decimal point designation switch 39 was set in the same one-decimal place mode "1" which was the same as that set last time. The same keys as up to the "2" and "." keys were then depressed subsequently to the key depressions of FIG. 22(f), but the numerical key "2" different from the key depressed last time was then depressed. Thus, when the "=" key is then depressed, the speaker 9 temporarily generates an alarm sound "pi, pi, . . . ", the numerical value "2.2" wrongly input this time is displayed in a blinking manner in the display window 7a and "THIS TIME" is displayed in the massage display area (steps K16, K21–24).

As described above, by displaying, in a blinking manner, data which is not coincident with the data set last time, it is ensured to inform the operator that there was a mistake in the key-in operation or in the designation of rounding operation state and to let the operator recognize what the mistake is.

Since in the computer of this embodiment the numerical value and calculation command data set last time and those set this time are alternately displayed in the display window 7a by depressing the confirmation ("CNF") key, the data input last time can be confirmed in the display window 7a and a possible mistake can be corrected immediately.

The computer of the present invention is not limited to the structure of the above embodiments. For example, while in the embodiment the operation of the inventive computer has been described which includes the decimal point designation switch 39 used to designate to which decimal place the numerical value should be calculated, and the round switch 38 used to designate discarding or rounding the figure of a decimal place directly below the decimal place designated by the decimal point designating switch 39, no decimal point designation switch 39 is required, of course, when the computer is of the type in which a numerical value is calculated to fixed decimal places.

While in the present embodiment the data input last time and this time is alternately displayed by depressing the confirmation ("CNF") key, the data input last time and this time may be displayed alternately automatically at predetermined intervals of time if there is a wrong input in the proof operation.

What is claimed is:

1. A computer comprising:
    calculation expression data input means for sequentially providing calculation expression data to the computer;
    a display device for displaying input calculation expression data provided by said calculation expression data input means;
    a storage device for sequentially storing the calculation expression data provided by said calculation expression data input means;
    mode setting means for selectively setting one of a first mode and a second mode;
    first display control means, responsive to the mode setting means setting the second mode, for controlling said display device to display that the second mode is set;
    comparative determination means, responsive to new calculation expression data provided by said calculation expression data input means, when the second mode is set by said mode setting means, for sequentially and comparatively determining whether the calculation expression data stored in said storage device coincides with the new calculation expression data;
    input control means, responsive to said comparative determination means determining that the calculation expression data stored in said storage device is not coincident with the new input calculation expression data, for preventing use of the calculation expression data provided by the calculation expression data input means; and
    second display control means, responsive to said comparative determination means determining that the calculation expression data stored in said storage device is not coincident with the new calculation expression data, for controlling said display device to display a result of determination made by said comparative determination means.

2. A computer according to claim 1, wherein said comparative determination means comprises means responsive to time function data of the new calculation expression data provided for comparing the calculation expression data stored in said storage device with the new calculation expression data.

3. A computer according to claim 1, wherein said input control means comprises a timer for preventing use of a further input of calculation expression data for a predetermined time after said comparative determination means determines that the calculation expression data stored in said storage device is not coincident with the new calculation expression data.

4. A computer according to claim 1, wherein said input control means comprises means for preventing use of a further input of calculation expression data until a particular key is activated after said comparative determination means determines that the calculation expression data stored in said storage device is not coincident with the new calculation expression data.

5. A computer according to claim 1, wherein said input control means comprises data nullifying means for nullifying further input data until one of said calculation expression data and new calculation expression data has been corrected after said comparative determination means determines that the calculation expression data stored in said storage device is not coincident with the new calculation expression data.

6. A computer according to claim 1, further comprising:
    storage control means for preventing the storage of the calculation expression data provided by said calculation expression data input means in said storage device after said storage device overflows; and
    reporting means responsive to the comparative determination means for reporting when said storage device is overflowing.

7. A computer comprising:
    calculation expression data input means for sequentially providing calculation expression data to the computer;
    a display device for displaying input calculation expression data provided by said calculation expression data input means;
    a storage device for sequentially storing the calculation expression data provided by said calculation expression data input means;
    calculation means for sequentially performing a calculation on the calculation expression data provided by said calculation expression data input means;
    mode setting means for selectively setting one of a first mode and a second mode;
    number-of-place designation means for designating a number of decimal places of a result of the calculation performed by said calculation means when the first mode is set by said mode setting means;
    decimal place processing means for processing the result of the calculation performed by said calculation means to the number of decimal places designated by said number-of-place designation means;
    a number-of-place storage device for storing the number of decimal places designated by said number-of-place designation means;
    first display control means for displaying on said display device that the second mode is set by said mode selecting means;
    comparative determination means, responsive to new calculation expression data provided by said calculation expression data input means, when the second mode is set by said mode setting means, for sequentially and comparatively determining whether the calculation expression data stored in said storage device coincides with the new calculation expression data and whether the number of decimal places stored in said number-of-places storage device is coincident with a current number of decimal places designated by said number-of-place designation means;

reporting means for reporting at least one result of the two determinations made by said comparative determination means; and second display control means, responsive to the determinations of said comparative determination means, for controlling said display device to display the at least one result of the two determinations made by said comparative determination means.

8. A computer according to claim 7, wherein said number-of-places storage device comprises a calculation state storage section, responsive to function data of the new calculation expression data provided to the computer, for storing the number of decimal places designated by said number-of-place designation means in correspondence to the function data of the new calculation expression data.

9. A computer according to claim 7, wherein said number-of-places storage device comprises a switched state storage section for storing the number-of-decimal places designated by said number-of-place designation means each time the designated number of decimal places changes.

10. A computer according to claim 7, wherein said comparative determination means comprises:

comparison means, responsive to time function data of the new calculation expression data provided, for comparing the calculation expression data stored in said storage device with the new calculation expression data; and place comparison means for comparing the number of decimal places stored in said number-of-places storage device with the current number of decimal places designated by said number-of-place designation means when the function data is provided.

11. A computer according to claim 7, wherein said number-of-place designation means comprises:

decimal place designating means for designating a number of decimal places; and processed place designating means for designating whether the result of the calculation performed by the calculation means should be rounded or truncated to the number of decimal places designated by said decimal place designating means.

12. A computer according to claim 7, wherein said reporting means comprises a display switching device for alternately displaying non-coincident portions of the calculation expression data stored in said storage device and the new calculation expression data.

13. A computer according to claim 12, wherein when the non-coincident data portions are alternately displayed by said display switching device, and said reporting means comprises means for indicating which of the calculation expression data stored in said storage device and the new calculation expression data is displayed data.

14. A computer according to claim 7, further comprising input control means for preventing the input of calculation expression data after said comparative determination means determines that the calculation expression data stored in said storage device is not coincident with the new calculation expression data.

15. A computer according to claim 14, wherein said input control means comprises a timer for preventing further input of calculation expression data for a predetermined time after said comparative determination means determines that the calculation expression data stored in said storage device is not coincident with the new calculation expression data.

16. A computer according to claim 7, further comprising:

storage control means for preventing the storage of the calculation expression data provided by said calculation expression data input means in said storage device after said storage device overflows; and reporting means responsive to the comparative determination means for reporting when said storage device is overflowing.

17. A recording medium which contains a program for causing a computer to operate as:

mode setting means for selectively setting one of a first mode and a second mode;

processing means, responsive to calculation expression data being input sequentially by the input means, when the first mode is set by the mode setting means, for storing the calculation expression data in the storage device and for sequentially performing a calculation on the calculation expression data;

first display control means, responsive to the second mode being set by said mode selecting means, for controlling a display device to display that the second mode is set;

comparative determining means, responsive to new calculation expression data provided by the calculation expression data inputting means, in the set second mode, for sequentially and comparatively determining whether the calculation expression data stored in said storage device coincides with the new calculation expression data;

input control means, responsive to said comparative determining means determining that the calculation expression data stored in said storage device is not coincident with the new calculation expression data, for preventing use of the calculation expression data provided by the input means; and second display control means, responsive to said comparative determining means determining that the calculation expression data stored in said storage device is not coincident with the new calculation expression data, for controlling a display device to cause the display device to display a result of determination made by said comparative determining means.

18. A recording medium which contains a program for causing a computer to operate as:

mode setting means for selectively setting one of a calculation mode and a proof mode;

a storage device, responsive to calculation expression data provided sequentially by calculation expression data inputting means, when the calculation mode is set by said mode setting means, for sequentially storing the provided calculation expression data;

calculating means for sequentially performing a calculation on the calculation expression data provided by the calculation expression data inputting means to generate a result;

number-of-place designating means for designating a number of decimal places of the result of the performed calculation to which the result is to be processed;

processing means for processing the result of the calculation to the number of decimal places designated by said number-of-place designating means;

a number-of-place storage device for storing the designated number of decimal places;

first display control means, responsive to the proof mode being set by said mode setting means, for controlling the display device to display that the proof mode is set;

determining means, responsive to new calculation expression data provided by the calculation expression data inputting means, for sequentially and comparatively determining whether the calculation expression data stored in said storage device coincides with the new calculation expression data, and whether the number of decimal places stored in the number-of-place storage device is coincident with a current designated number of decimal places;

reporting means for reporting at least one result of the two determinations made by said determining means; and second display control means, responsive to the determinations of said determining means, for controlling a display device to cause the display device to display the at least one result of the two determinations made by said determining means.

19. A method of proof comprising the steps of:

(a) setting a calculation mode;

(b) inputting calculation expression data sequentially in the set calculation mode;

(c) storing the calculation expression data sequentially in a storage device in the set calculation mode;

(d) operating on the sequentially input calculation expression data;

(e) setting a proof mode;

(f) displaying that the proof mode is set;

(g) inputting calculation expression data in the set proof mode;

(h) sequentially determining in the set proof mode whether the input calculation expression data coincides with the calculation expression data stored in the storage device; and (i) displaying in the set proof mode a result of the sequential determination.

20. A method of proof comprising the steps of:

(a) setting a calculation mode;

(b) inputting calculation expression data sequentially in the set calculation mode;

(c) storing the calculation expression data in a storage device in the set calculation mode;

(d) sequentially operating on the input calculation expression data to generate a result in the set calculation mode;

(e) displaying a result of the operation in the set calculation mode;

(f) displaying that the proof mode is set, in the set calculation mode;

(g) designating a number of decimal places of the result of the operation in the set calculation mode;

(h) processing the result of the operation to the designated number of decimal places in the set calculation mode;

(i) storing the designated number of decimal places in the set calculation mode;

(j) setting a proof mode in place of the calculation mode;

(k) displaying the proof mode;

(l) sequentially and comparatively determining, in response to sequentially input calculation expression data, in the set proof mode, whether the input calculation expression data coincides with the stored calculation expression data and whether the designated number of decimal places coincides with the stored number of decimal places; and (m) reporting and displaying at least one result of the two determinations.

\* \* \* \* \*